United States Patent [19]

Aslanian et al.

[11] Patent Number: 5,111,384
[45] Date of Patent: May 5, 1992

[54] SYSTEM FOR PERFORMING DUMP ANALYSIS

[75] Inventors: Edouard Aslanian, Somerville; Susan L. Pitts, Billerica; Leon A. Sztucinski, Brookine, all of Mass.

[73] Assignee: Bull HN Information Systems Inc., Billerica, Mass.

[21] Appl. No.: 481,143

[22] Filed: Feb. 16, 1990

[51] Int. Cl.⁵ .................................. G06F 11/00
[52] U.S. Cl. .................. 395/575; 371/15.1; 364/DIG. 1; 395/1
[58] Field of Search ............ 371/15.1; 364/513, 274.2, 364/274.3, 275.7; 395/908, 50

[56] References Cited

U.S. PATENT DOCUMENTS

| | | | |
|---|---|---|---|
| 4,485,440 | 11/1984 | Duff et al. | 364/200 |
| 4,559,596 | 12/1985 | Ohnishi | 364/200 |
| 4,642,763 | 2/1987 | Cummins | 364/300 |
| 4,964,125 | 10/1990 | Kim | 371/15.1 |
| 4,972,453 | 11/1990 | Daniel, III et al. | 371/15.1 |

Primary Examiner—Jerry Smith
Assistant Examiner—Russell E. Cass
Attorney, Agent, or Firm—Faith F. Driscoll; John S. Solakian

[57] ABSTRACT

A system for automating the dump analysis process includes a remotely located host computer system which, in response to requests from a local expert computer system, retrieves only relevant values from one or more physical memory dumps. The expert system reconstructs from these values the operating system control structures represented in the dump, and applies expert knowledge on these control structures to determine the symptom of the problem occurring on the computer system which stopped operating and generated the dump.

24 Claims, 32 Drawing Sheets

DUMP FILE INPUT TO RETRIEVAL MODULE

| Address | 0 | 1 | 2 | 3 | 4 | 5 | 6 | 7 | Ascii Rep |
|---|---|---|---|---|---|---|---|---|---|
| 00000000 | 83C0 | FFFE | 006F | E073 | 83C0 | 0608 | FFFF | FFFF | ....o.s.. |
| 00000008 | FFFF | FFFF | 0000 | 0000 | 0000 | 0000 | 0000 | 0000 | ........ |
| 00000010 | 0001 | 2268 | 0000 | 0000 | 0201 | 0405 | FFFF | FFFF | ..."h........ |
| 00000018 | 0000 | 12E2 | 0000 | 0000 | 0000 | 3F2B | 033F | 0000 | ......?+.?.. |
| 00000020 | 2410 | 0000 | 0000 | 0441 | 0000 | 046B | 0000 | 046B | $....A..k...k |
| 00000028 | 0000 | 046B | 0000 | 046B | 0000 | 046B | 0000 | 046B | ..k..k..k..k |
| 00000030 | 0000 | 046B | 0000 | 046B | 0000 | 046B | 0000 | 046B | ..k..k..k..k |
| 00000038 | 0000 | 046B | 0000 | 046B | 0000 | 046B | 0000 | 046B | ..k..k..k..k |
| 00000040 | 0000 | 046B | 0000 | 046B | 0000 | 046B | 0000 | 046B | ..k..k..k..k |
| 00000048 | 0000 | 046B | 0000 | 046B | 0000 | 046B | 0000 | 046B | ..k..k..k..k |
| 00000050 | 000A | C8E7 | 0000 | 046B | 0000 | 046B | 000A | C8E5 | ...k..k.. |
| 00000058 | 0000 | 046B | 0000 | 046B | 0000 | 046B | 0000 | 046B | ..k..k..k..k |
| 00000060 | 0000 | 046B | 0000 | 046B | 0000 | 046B | 0000 | 046B | ..k..k..k..k |
| 00000068 | 0000 | 046B | 0000 | 046B | 0000 | 046B | 0000 | 046B | ..k..k..k..k |
| 00000070 | 0000 | 046B | 0000 | 046B | 0000 | 046B | 0000 | 046B | ..k..k..k..k |
| 00000078 | 0000 | 046B | 0000 | 046B | 0000 | 046B | 0000 | 496B | ..k..k..k.Ik |
| 00000080 | 0000 | 05FA | 0000 | 061D | 0000 | 0686 | 0003 | B4F2 | ............ |
| 00000088 | 000C | B08C | 0000 | 07A0 | 0000 | 0DC2 | 0003 | C9C8 | ....v..z@... |
| 00000090 | 0005 | A176 | 0008 | 5A40 | 0003 | ACBC | 0003 | B4F2 | ...v..Z@.... |
| 00000098 | 0003 | C37E | 0003 | DE2A | 0003 | 7382 | 0000 | 0000 | ....*..s.... |
| 000000A0 | 0000 | 0000 | 0000 | 0000 | 0000 | 0000 | 0000 | 0000 | ........ |
| 000000A8 | 0000 | 4054 | 0000 | 0000 | 0000 | 0000 | 0000 | 0000 | ..@T........ |
| 000000B0 | 0003 | A176 | 0000 | 41E0 | 0003 | 4676 | 0003 | 48C0 | ...A..Fv..H. |
| 000000B8 | 0000 | 0000 | 0000 | 0000 | 0000 | 0000 | 0000 | 0000 | ........ |
| 000000C0 | 0000 | 0000 | 0003 | AE36 | 0000 | 0000 | 0000 | 0000 | ......6..... |

```
000000C8  0000 0000 0000 0000 0000 0000 0000 0000  ................
000000D0  0000 0000 A07C 0000 0000 0000 E7D6 ADA6  .....|..........
000000D8  001F 0000 0000 0000 001F B5BC 0000 0000  ................
000000E0  0000 0000 0000 0000 001F 937C 0000 0000  ...........|....
000000E8  0000 0000 0000 0000 0000 0000 0000 0000  ................
000000F0  0000 0000 0000 0000 0000 0000 0000 0000  ................
000000F8  0000 0000 0000 0000 0000 0000 000C B1B0  ................
00000100  0000 0E16 0000 0000 0000 0201 0405 0000  ................?.
00000108  0000 12E2 0000 0000 0000 0000 3F02 033F  ....?...?...?..?
00000110  0000 0000 0000 0000 0000 046B 0000 0000  ...........k....
00000118  0000 046B 0000 0000 0000 046B 0000 046B  ...k.......k...k
00000120  0000 046B 0000 0000 0000 046B 0000 046B  ...k.......k...k
00000128  0000 046B 0000 0000 0000 046B 0000 046B  ...k.......k...k
00000130  0000 046B 0000 0000 0000 046B 0000 046B  ...k.......k...k
00000138  0000 046B 0000 0000 0000 046B 0000 046B  ...k.......k...k
• • •
```

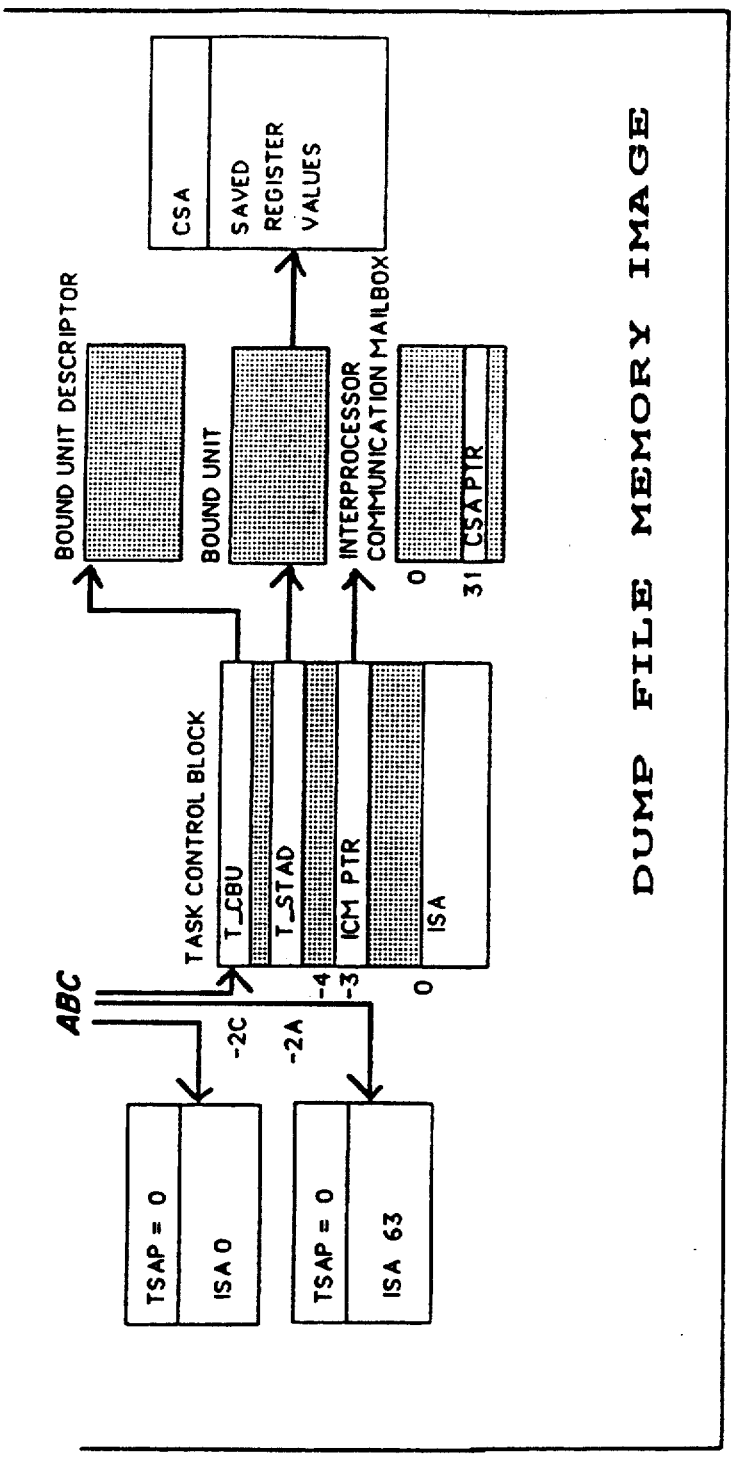
Fig. 5 SHEET 2 OF 2

HARDWARE DEDICATED MEMORY AT ADDRESS 00000000

| Offset | Size | Label | Value | Description |
|---|---|---|---|---|
| 00 | 2 | | 83C0 FFFE | Entry to Power Failure Restart routine |
| 02 | 2 | | 006F E073 | Reserved for future use |
| 04 | 2 | | 83C0 0608 | Reserved for future use |
| 06 | 2 | | FFFF FFFF | Reserved for future use |
| 08 | 2 | | FFFF FFFF | Reserved for future use |
| 0A | 2 | | 0000 0000 | NATSAP3 - Pointer to next available TSA (not used) |
| 0C | 2 | | 0000 0000 | NATSAP2 - Pointer to next available TSA (not used) |
| 0E | 2 | | 0000 0000 | NATSAP1 - Pointer to next available TSA (not used) |
| 10 | 2 | | 0001 2268 | NATSAP0 - Pointer to next available TSA |
| 12 | 2 | | 0000 0000 | Reserved for hardware use |
| 14 | 1 | | 02 | Left: Stackfault interrupt level |
|    | 1 | | 01 | Right: Watchdog timer interrupt level |
| 15 | 1 | | 04 | Left byte: Time slicer clock interrupt level |
|    | 1 | | 05 | Right byte: Real time clock interrupt level |
| 16 | 1 | | FF | Page Content Addressable Memory flush indicator |
| 17 | 1 | | FF | Segment Content Addressable Memory flush indicator |
| 18 | 2 | | 0000 12E2 | Pointer to GCOS6 MOD400 System Control Block |
| 1A | 2 | | 0000 0080 | Physical address whose content displayed by SMF |
| 1C | 1 | | 00 | Soft. halt status: Left: level, Right: Halt code |
| 1D | 1 | | 3F2B | Left: Unused, Right: Page fault interrupt level |
| 1E | 1 | | 033F | Left: Semaphore instruction interrupt level |
|    | 1 | | | Right: SMF interrupt level |
| 1F | 1 | | 0000 | Number of corrected memory errors (not for 6 PLUS) |
| 20 | 4 | | 2410 0000 | Interrupt Activity Flag Table |
|    |   | | 0000 0441 | |
| 24 | 2 | | 0000 046B | Trap Vector 2E: RFU |
| 26 | 2 | | 0000 046B | Trap Vector 2D: RFU |

```
         ...7C  2
            7E  2
            80  2   0000 046B  Trap Vector 02:  Trace/Breakpoint trap
            82  2   0000 496B  Trap Vector 01:  Monitor call (MCL)
            84  2   0000 05FA  IV#0   Powerfailure Interrupt
            86  2   0000 061D  IV#1
                    0000 0686  IV#2   TSA exhaustion
                    0003 B4F2  IV#3   Inhibit interrupts ...FC  2
            FE  2   0000 0000  IV#3E
                    000C B1B0  IV#3F
```

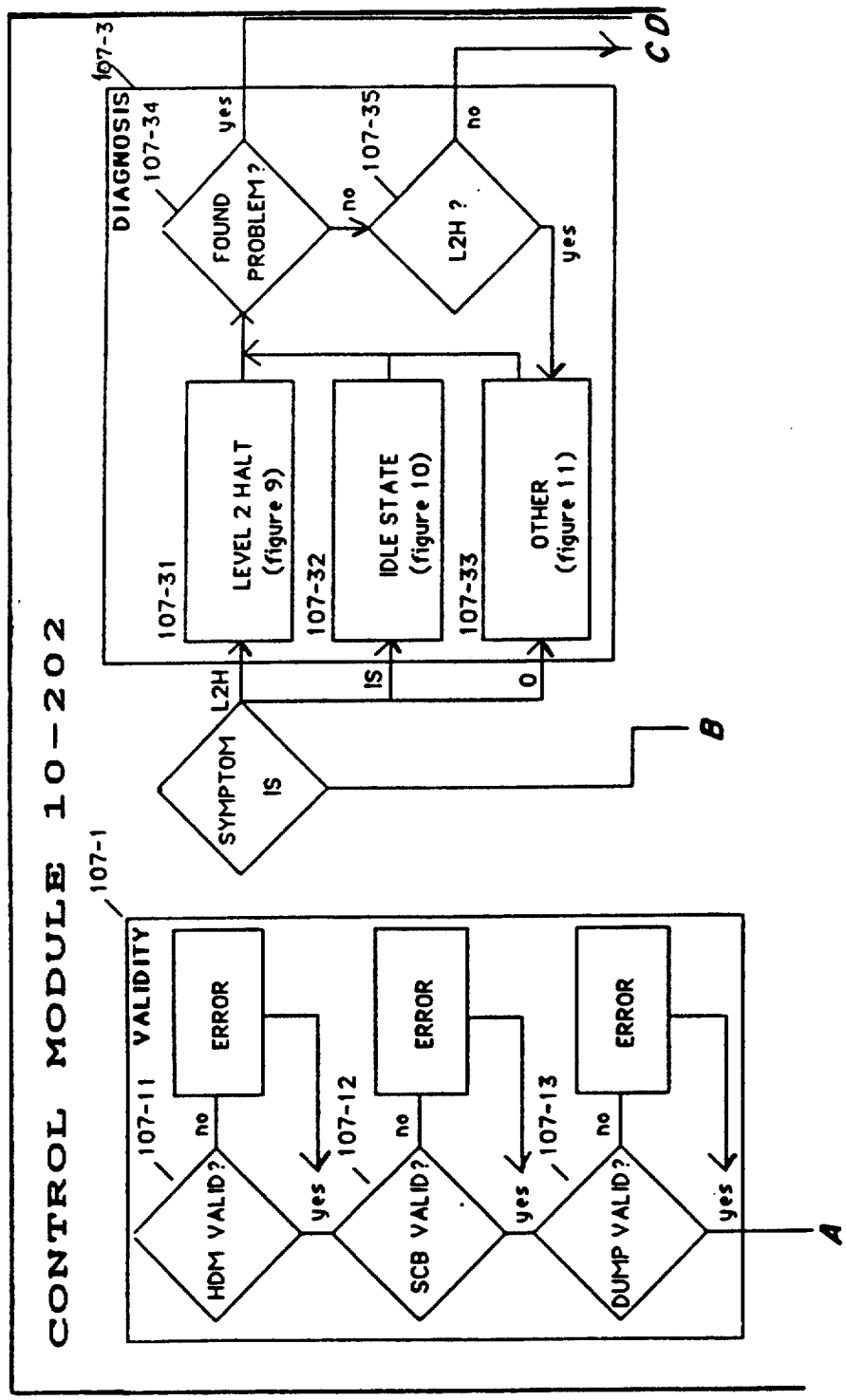
Fig. 7 SHEET 1 OF 2

BEGINNING DIAGNOSIS OF ^F3USR2>UDD>EXP>NAME>DUMP256>DUMPFILE

* GENERAL INFORMATION *

8-1 — The address of the system control block is 000012E2

8-2 — Type of system is DPS6 PLUS
Looking at the STI for the Z3EXECUTIVEL bound unit:
Its value is: B3OSEMX10045
Operating system is HVS, Release 1.0, Update 3.0
Warning: Customer software not up to date, consider updating the
software before taking action on this dump, i.e., send
to the customer the most recent bound unit or apply
adjustments as necessary.

8-3 — Memory management unit is VMMU 8-4 — Time of system boot: 1988/08/25 1657:36.804
Time of system dump: 1988/08/25 1845:55.751

8-5 — Active levels for CPU 0 are:  2  5  B  35  39  3F 8-6 — Saved registers for CPU 0 are:
E0:000056E6  C0:600B
B7:0003C2BD  B6:000012E2  B5:0003B4BC  B4:0CCCCCCC
B3:0001273E  B2:0003D9CE  B1:000F531A
D7:CCCC  D6:CCCC  D5:FFC1  D4:0002  D3:0022  D2:090C  D1:0322

8-7 — The initial number of TSAs configured is 510
The current number of free TSAs is 478
The minimum number of TSAs ever reached is 472
Number of TSAs is not low now and has never been low The initial number of IRBs configured is 720
The current number of free IRBs is 644
The minimum number of IRBs ever reached is 630
Number of IRBs is not low now and has never been low Fig. 8
SHEET 1 OF 3

```
8-8 \ Restricted functionality indicator is 0004
       The enabled bits are:
       D Get extra memory 'chunk'

8-9 \ The switch word for $S group is:  0001
       The enabled bits are:
       F Force level 2 halt when system task traps, when stack expansion
       fails, or on error reading system overlay 8-10 \ LDBU list (name, address, STI):
       Z3EXECUTIVEL  00000000   B30SEMX10045
       ZXEDEF        0000A982   B30SE244004C
       Z4MCLH        0000AA70   B30SE244004E ZXCRTD        000C83FE   B30SE244004C
       PAGE         .000C84B2   B3PGRMX10041
       VSLICE        000CAEA4   B30SEMX1004H

*** DIAGNOSIS ***
8-11 \ Major symptom is a Level 2 Halt
8-12 \ Reboot reason code is 090C = System Task Trap
8-13 \ ** Task active at level B on CPU 0 caused the Level 2 Halt
       Address = 0003B4F2
       Group Name = $S
       Program Counter = 000056E6
       Instructions around Program Counter (instruction at PC in brackets):
       9870 030F B845 001A 9E52 8E70 0002 [DBC3] 001D DFC3 0006 FBC3 006A 0001 3500
       Relative offset 000056E6 of Z3EXECUTIVEL
       This is a device TCB.  Device word = 1A0B.  Channel # = 1A00
```

8-14 The TSAs for this task, from latest in time to earliest, are:

8-15 TSA at 00012738
Trap Number = 22
Instruction = 9F44
Program Counter = 000AE4C8
Instructions around Program Counter (instruction at PC in brackets):
CCC3 0012 DB80 0000 0000 DFC3 0012 [9F44] 002C D3C0 0618 9870 0160 D380 0003
Relative offset 00000768 of ZQLXPT
The ZQ in bound unit ZQLXPT suggests a communications BU 8-16 End of TSAs

---

8-17 Previously diagnosed problems which are similar to this one:

Star Number: I89110
Date Diagnosed: 09/14/1989
8-18 Action Taken: Unknown
Notes: Unknown 8-19 *** End of diagnosis Fig. 8
SHEET 3 OF 3

SYSTEM FOR PERFORMING DUMP ANALYSIS

BACKGROUND OF THE INVENTION

1. Field of Use

The present invention relates to knowledge-based systems and, more particularly, to the use of such systems in performing dump analysis.

2. Prior Art

Computer operating systems characteristically use control structures to maintain order in processing. The control structures of an operating system are small collections of related information pertaining to some feature of the operating system.

When a computer system encounters a major problem requiring an interruption of its operation, a physical memory dump is generated for subsequent analysis by system engineers before the system shuts down. Such memory dumps represent the state of the operating system control structures at the time the problem appeared in the system.

Dump analysis is a difficult task. Dumps usually contain a substantial amount of information which encompasses the totality of the operating system structures distributed throughout memory in an unpredictable fashion. Furthermore, since numeric notations (hexadecimal numbers usually) are typically used to represent operating system structures, the interpretation of dumps is generally left to experts for deciphering. Finally, dump analysis requires specific knowledge about operating system structures of specific computer systems that only a few experts possess.

To facilitate the dump analysis task, some system tools have provided facilities for generating a human readable display of memory values in response to user commands. One such system is described in copending U.S. patent application Ser. No. 06/913,157, filed on Sep. 26, 1986. This system provides customized displays from memory or memory dumps with differing internal structure format, by storing a description of the operating system structures in a control structure file which is separate from the program.

In this system, only the control structure file needs to be modified when changes in operating system structures occur. Other system tools provide disassemblers that translate numeric words back into the corresponding assembly language instructions, thus making the dump more human readable or understandable.

While such tools do make dump analysis a less cumbersome task by enabling the display of the operating system structures contained in a dump in a more understandable form, the user is still required to know in advance where to look and what to look for. To the extent that the user does not know where a specific structure is located, the user must browse or search through the operating system structures. This requires additional time and a certain difficulty. Also, even with a good display capability, users still must be able to recognize that they have found the desired information when they see it.

Accordingly, it is a primary object of the present invention to provide a system which automates the analysis of memory dumps.

It is a further object to provide a system which minimizes the amount of time and knowledge required to locate the symptom of a problem resulting in a dump.

SUMMARY OF THE INVENTION

The above and other objects of the present invention are achieved by a preferred embodiment of system which includes at least one remotely located host system and a local expert system connected through a communications link. The host system has storage for one or more memory dumps and a retrieval module. The expert system includes knowledge representation and control modules.

The expert system control module includes a knowledge base and an inference processing unit. The knowledge base stores descriptive information representative of different objects and rulesets linked to the objects so that the inference processing unit can interpret the rulesets and derive conclusions using a premise-conclusion if-then form of reasoning. The objects include a number of control objects, each object described by a frame comprising a plurality of slots containing information representing an attribute of that object or a relationship between the object and another object.

In the preferred embodiment, the control objects perform such operations as accessing memory dump information from the host system, creating instances of data structures using retrieved memory dump information and control structures stored in the knowledge base, writing files in the expert system, controlling the firing of rulesets contained in the knowledge base and looking up known problems. The data structures stored in the knowledge base correspond to the operating system control structures includable within each version of each operating system used with each different model of computer system producing memory dumps on which the system of the present invention is used to perform analysis. Different rulesets and subsets correspond to different tasks or major problems symptoms performed by the control module.

In operation, the retrieval module receives specific instructions from the expert system to access a memory dump, retrieves a given amount of information at a predetermined location in the memory dump, formats this information, and returns it to the local expert system.

The knowledge representation module accepts a request from the control module and searches the knowledge base for an instance of a control structure that matches the request. In the event such a structure has been created, the knowledge representation module simply returns parts of or the whole structure in response to the request. Alternatively, when the instance of the control structure does not exist in the knowledge base, the knowledge representation module then transfers control to a host control object which transfers the request to the host system retrieval module.

The retrieval module responds to the request by returning to the knowledge representation module, a series of values as described above. The knowledge representation module retrieves the corresponding operating system control structure from the knowledge base, fills this control structure with the actual values received, and links this updated structure to the ones already present in the knowledge base of the expert system. Then, it returns parts of or the whole control structure to the control module in response to the original request.

The control module makes assumptions based on the information contained in the control structures received from the knowledge representation module, makes requests for other operating control structure and derives conclusions about a given problem by invoking different rulesets as a function of the major problem symptom, after determining the dump information is valid. That is, the control module performs a series of tasks using rulesets and subrulesets which include checking the validity of the memory dump and determining whether a particular major problem symptom was caused by a discernable hardware error. Once a major problem symptom is detected, control is handed over to the ruleset designed to process the symptom.

According to the present invention, the control module of the expert system of the preferred embodiment includes a batch memory dump capability for automatically processing a large number of memory dumps according to specific criteria. Such criteria define the handling of each dump listed within a batch file relative to load, save and run operations. For example, the expert system can be programmed to save those portions of each dump received from the host system, clear each previously loaded dump or overwrite a previous diagnosis with a new diagnosis when performed on a previously processed memory dump.

From the above, it is seen that the system of the present invention can be used to completely automate dump analysis. The system of the present invention reduces the amount of data to be considered for analysis to that which is relevant to the problem at hand. The control module determines which data is relevant and which is to be retrieved next from a dump on the basis of the data retrieved previously.

The system of the present invention includes the capability of generating explanatory reports documenting the analysis as it is performed. This reduces the amount of knowledge required to perform dump analysis when human intervention can not be avoided.

Also, the system of the present invention provides a knowledge base of all operating system structures and is thus enabled to support all versions of the operating system control structures, a by-product of using an object-oriented paradigm in the knowledge representation module.

Further, the system of the preferred embodiment also includes a facility that updates a known problem file, a database of all dumps previously analyzed, which can be used for comparing the current problem to the ones stored in this known problem file to attempt to find a similar problem that has already been solved, thus avoiding solving the same problem twice.

The novel features which are believed to be characteristic of the invention both as to its organization and method of operation, together with further objects and advantages, will be better understood from the description in the following section when considered in connection with the accompanying drawings described in this section. It is to be expressly understood, however, that each of the drawings is given for the purpose of illustration only and is not intended as a definition of the limits of the present invention.

BRIEF DESCRIPTION OF THE DRAWINGS

FIG. 4 is an extract of a memory dump applied as an input to the retrieval module of FIG. 2.

FIG. 6 shows in greater detail, an example of the internal object representation of a specific operating system control structure created by the knowledge representation module, according to the present invention.

FIG. 8 is a script of a dump analysis session on a sample memory dump used in describing the operation of the system of FIG. 1.

DETAILED DESCRIPTION OF THE PREFERRED EMBODIMENT

Figure 1:
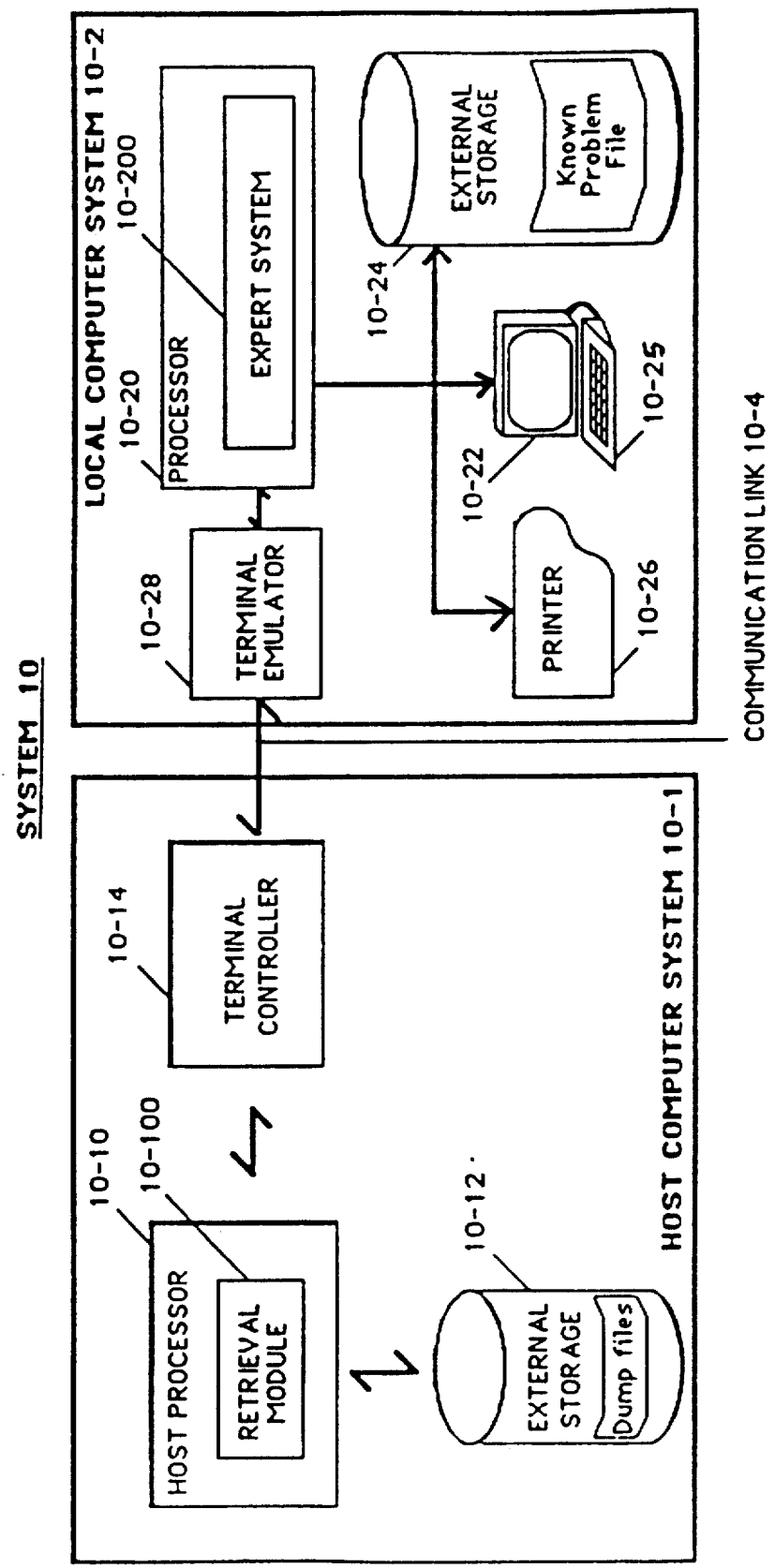
FIG. 1 is a block diagram of a system which incorporates the principles of the invention.

FIG. 1 shows the system of the embodiment of the present invention. As shown, the system 10 includes a remotely located host computer system 10-1 and a local computer system 10-2 interconnected to exchange information through a standard communications link 10-4, such as a telephone network, local area network (LAN) or direct line. The host computer system 10-1 includes a host processor 10-10 in which the retrieval module 10-100 is resident, external storage 10-12, such as disk storage on which one or more memory dumps reside, and a terminal controller 10-14 which serves as the interface to communications link 10-4. The controller 10-14 can correspond to a LAN controller, communications controller or similar device. The host computer system 10-1 can be considered conventional in design and may, for example, take the form of a DPS6000 minicomputer system, manufactured by Bull HN Information Systems Inc.

The local computer system 10-2 in the simplest form can be implemented using a conventional personal computer. It can also take the form of a workstation or another minicomputer system. As shown, system 10-2 includes a processor 10-20 which contains the components of an expert system 10-200 constructed according to the principles of the present invention for automating dump analysis. Processor 10-20 couples to a cathode ray tube (CRT) display unit 10-22 through which commands or user selections can be entered via a keyboard 10-25.

The processor 10-20 also couples to external storage 10-24, such as a disk device, from which the components which make up the expert system, are loaded into the memory of processor 10-20 as required. For a workstation, minicomputer system, or personal computer having a large main memory storage, the entire expert system will remain resident thereby enhancing system performance. As shown, system 10-2 further includes a printer 10-26 which can be used to provide a permanent record or listing of rules and explanatory data according to the present invention. In its simplest form, processor 10-20 connects to communications link 10-4 through a terminal emulator 10-28 via a standard modem which enables the exchange of information according to a particular communications protocol such as KERMIT.

Figure 2:
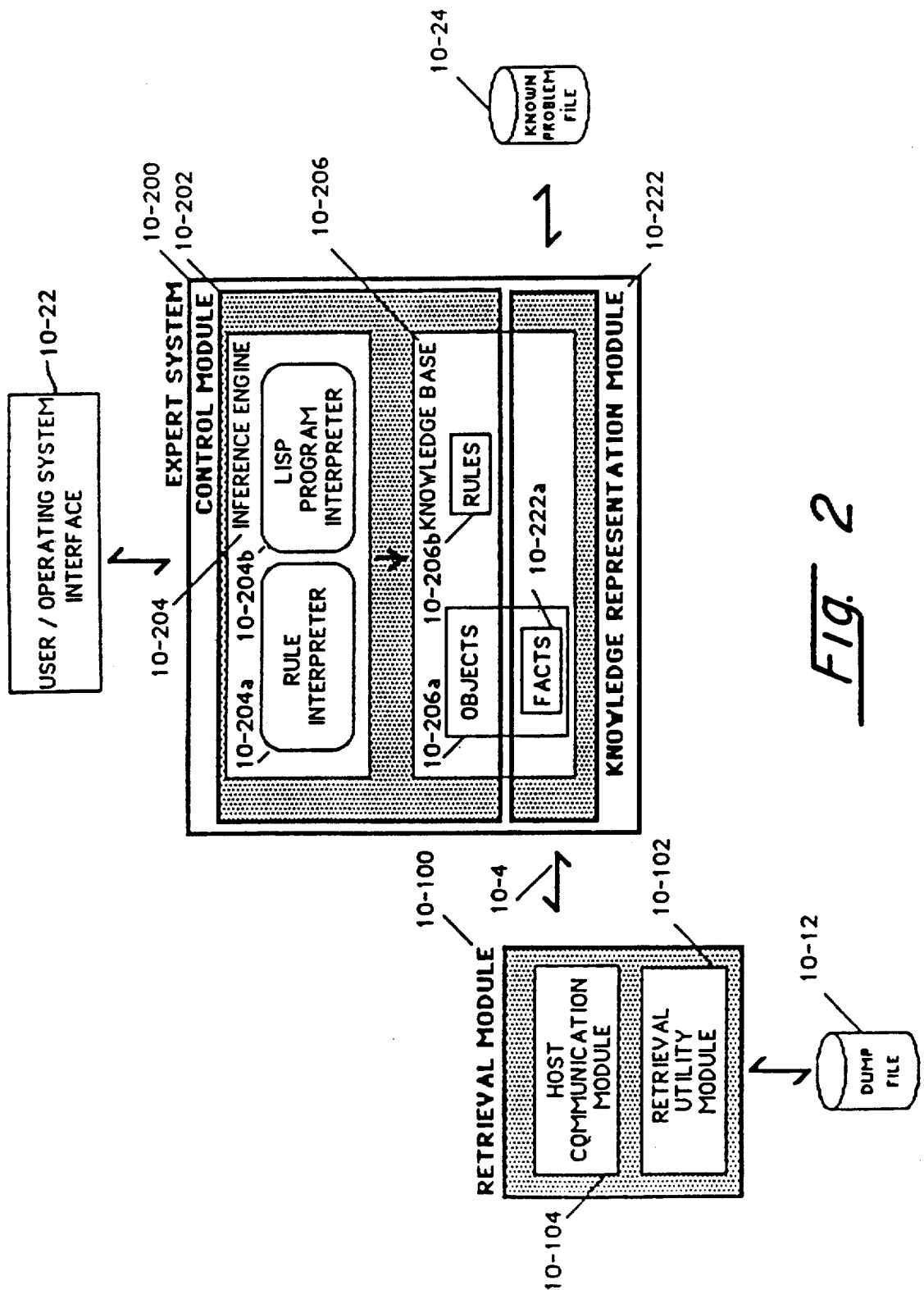
FIG. 2 shows in block diagram form, the major components included in the system of FIG. 2, according to the present invention.

FIG. 2 shows in greater detail, the major components of retrieval module 10-100 and expert system 10-200. It is seen that retrieval module 10-100 includes a retrieval utility program module 10-102 and a host communications module 10-104. The retrieval utility program module 10-102, in response to requests received from host communications module 10-104, retrieves specific amounts of data from a specific memory dump stored on external storage 10-12. Module 10-102 returns the requested data to module 10-104 which it transfers to the expert system 10-200 via communications link 10-4.

As shown in FIG. 2, expert system 10-200 comprises a control module 10-202 and knowledge representation module 10-222. The control module 10-202 includes an inference engine 10-204 and a knowledge base 10-206. Inference engine 10-204 includes a rule interpreter 10-204a and a procedural language or LISP program interpreter 10-204b. Knowledge base 10-206 includes a number of operating system objects 10-206a and a number of rulesets 10-206b. The organization of these objects are shown in greater detail in FIG. 3.

The control module 10-202 is coupled to communicate with user/operating system interface 10-22 and with knowledge representation module 10-222. As mentioned previously, the control module 10-202 includes a batch capability for automatically processing a large number of memory dumps according to specific criteria.

In those cases where there is a requirement for interaction between expert system 10-200 and an end user, such interaction takes place through interface 10-22. The end user interface 10-22 has the dual function of presenting information through consultations which include question and answering sessions, help giving interchanges and error indications through windows, menus and prompts and of accepting end user responses. In addition, the end user interface 10-22 may include a display mode component which enables the end user to browse through the operating system structures generated by the automated diagnosis process and currently represented in the system. This display mode also allows an end user to call on the knowledge representation and retrieval modules to retrieve, create, and browse through operating system structures that were not present in the system originally. Finally, the display mode allows the user to follow pointers to operating system structures to display these operating system structures by positioning the cursor on the field of an operating system structure that points to the one that the end user wants to display and pressing a single keyboard key.

As shown, knowledge representation module 10-222 communicates with control module 10-202 to process requests for specific operating system objects contained in the memory dump being analyzed and for known problem file information stored in external storage 10-24. The knowledge representation module 10-222 utilizes information in the form of facts 10-222a in processing requests as explained herein.

KNOWLEDGE BASE 10-206

Figure 3:
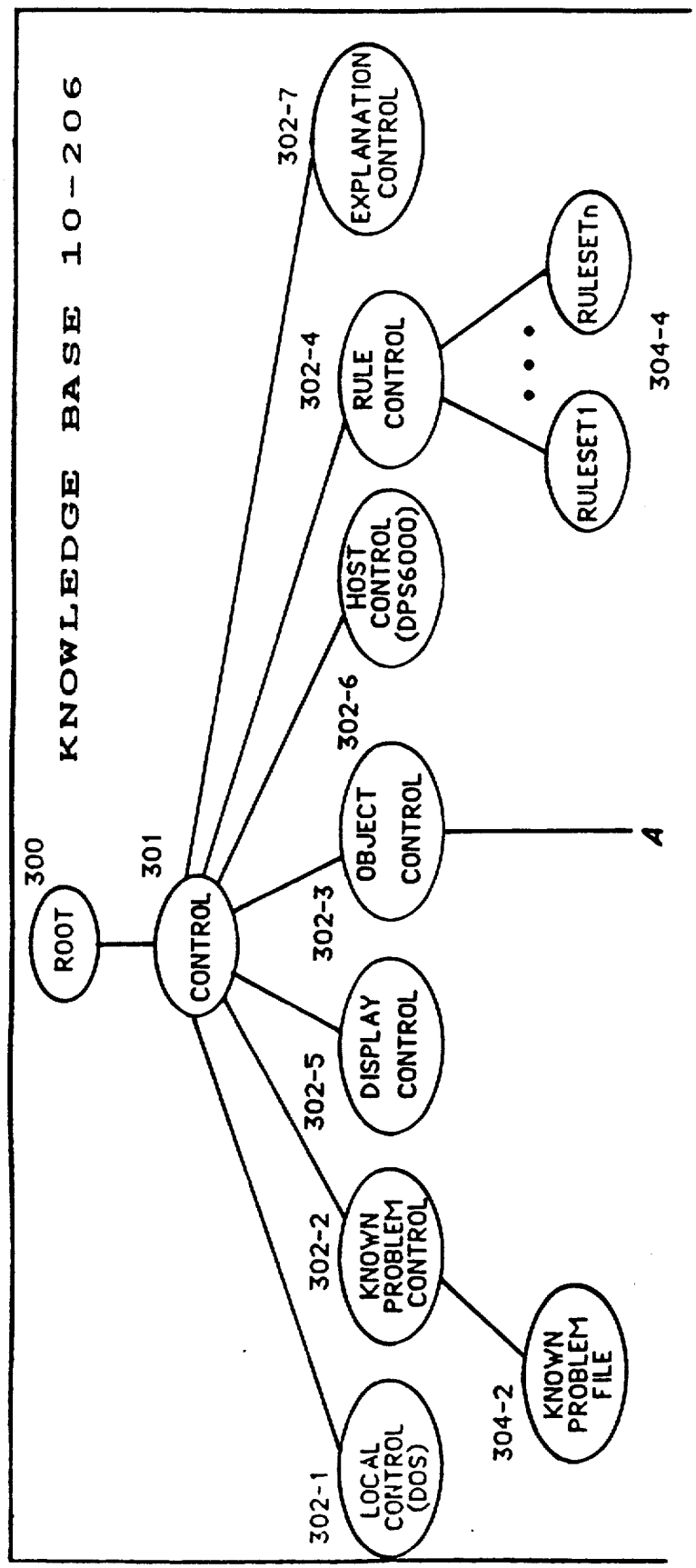
FIG. 3 shows in greater detail, the organization of the control module of FIG. 2, according to the principles of the present invention.
Figure 3:
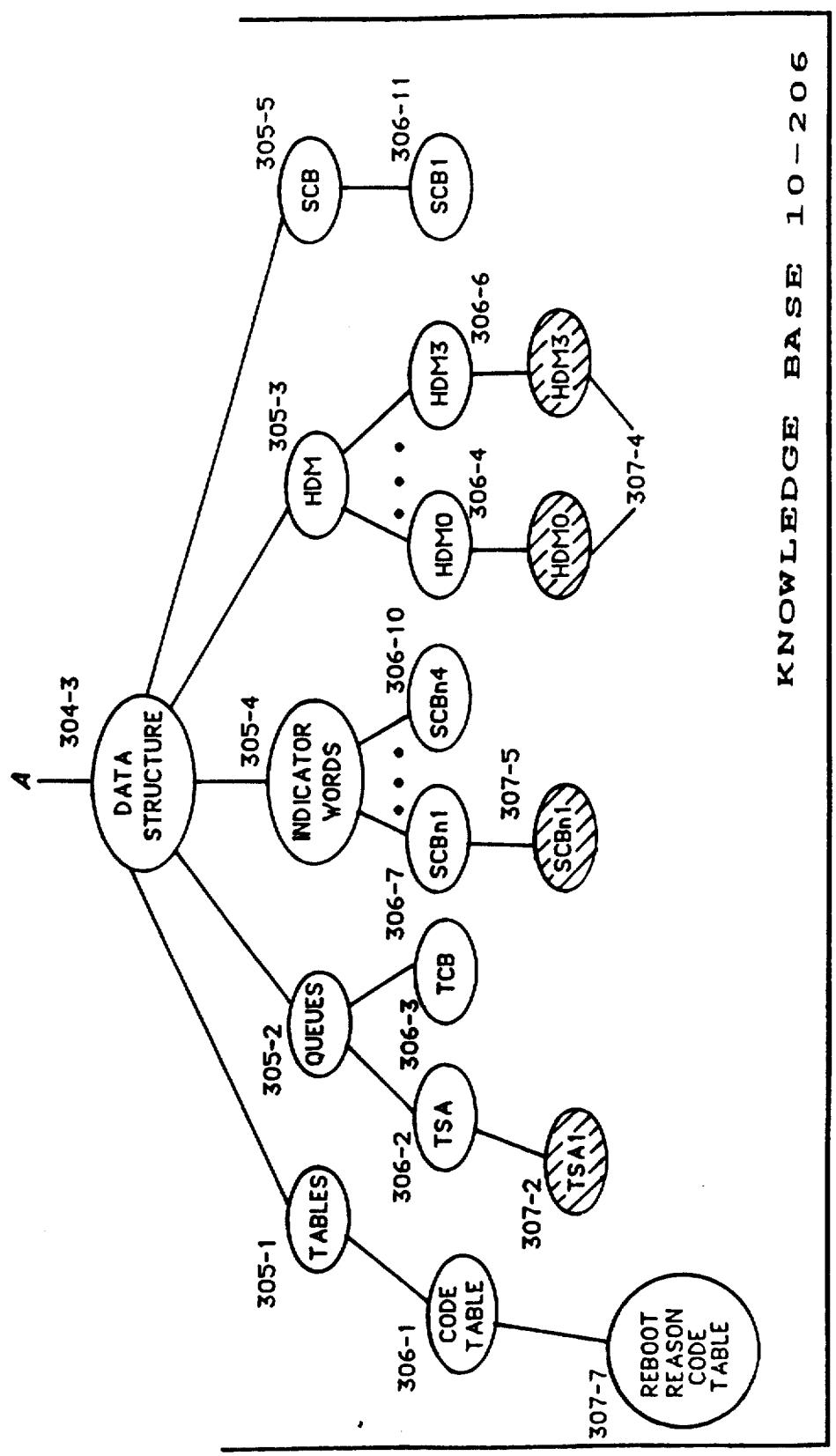

The organization of knowledge base 10-206 is shown in greater detail in FIG. 3. By way of background, in an expert system, knowledge about the domain of application is represented in the knowledge base by facts and rules. Accordingly, the knowledge base 10-206 of the preferred embodiment of the present invention is composed by facts 10-222a and rules 10-206b as indicated in FIG. 2.

The facts 10-222a are commonly derived from a frame-based system. As well known, a frame system is a network of frames and relations, corresponding to the nodes and links of a mathematical graph. Frame systems are organized in a hierarchy in which the high-level frames represent general concepts and the lower frames represent more specific concepts. At the lowest levels, the frames represent instances of those concepts. The concept at each frame is defined by a collection of attributes or properties which can have values and, in this respect, the frames and attributes in a frame system are comparable to the records and fields in a database system. Each attribute can have a descriptor associated with it to define the constraints on the values the attribute accepts. Each attribute can also have procedures or programs called daemons attached to it which are executed when the value of the attribute is modified. In such a system, a frame can inherit the attributes or properties of higher level frames.

The preferred embodiment uses a frame-type representation in an object-oriented organization in which the frames represent objects. More specifically, the frames representing general concepts are called classes and those representing specific occurrences of a concept are referred to as instances. In this context, attributes are termed slots, and slot inheritance, descriptors, and procedural attachment take place just as they did in the frame system. In object-oriented systems, however, objects communicate with one another by sending and receiving messages. When an object receives a message, it consults its predefined answers for messages to decide on hat action to take. These answers can be stored directly with the object or inherited from a higher level object somewhere in the network hierarchy. Usually, the action involves triggering some rules, executing procedural code, or sending new messages to other objects in the system.

Within the object paradigm, facts can be explicitly stated or automatically generated from objects. Facts are typically represented as logical expressions, relations, or assertions constituted of operands, atoms, and values. For example, an explicit fact could be represented by the triplet "John is 21" in which "John" is an atom, "is" is an operand, and "18" is a value. An implicit fact generated from an object could be represented by the triplet "John age 21", in which "John" would be an instance, "age" a slot of this instance, and "21" the value of this slot.

The second way in which knowledge is represented in the knowledge base 10-206 is through rules 10-206b. Rules take the form of a premise-conclusion of the form IF conditions THEN actions. Conditions are also called antecedents and actions are termed consequents. Antecedents and consequents consist of a series of patterns. A pattern is a generalization of a fact in that it can be a regular fact, or it may contain variables. Given this definition, one pattern in a rule can match a series of facts in the knowledge base. For example, the pattern represented by the triplet "John is ?age", where "?age" is a variable, would match any fact represented by the triplet containing "John", "s", and an integer in sequence.

Rule interpreter 10-204a interprets rules, matches them with facts, and draws conclusions from this knowledge. Evaluation starts with the data or set of facts corresponding to a specific problem currently in the knowledge base, which is then matched with the antecedents in each of the relevant rules to determine the applicability of each rule to the current situation.

In order to carry out this evaluation process, inference engine 10-204 compares the antecedents of the rules with the facts currently present in the knowledge base. When each pattern of the antecedent of a rule matches with the facts currently in the knowledge base, the patterns in the consequents of the rule are instantiated by propagation. That is, the variables in the patterns of the consequents take the values of the corresponding variables in the patterns of the antecedents, and the actions specified in the consequents of that rule are then executed. When this happens, the rule is said to fire or execute.

Usually, the inference engine 10-204 fires the first rules whose antecedents matches. However, control can be exerted on the firing process in many ways. For example, in the preferred embodiment, the rules are grouped into rulesets. In this context, the inference engine 10-204 only operates on the rules of one ruleset at a time, transferring control back and forth between rulesets when necessary. Furthermore, rules within a ruleset can be ordered for consideration by the inference engine using priorities. At a higher level, hierarchies of rulesets are used to organize, modularize, and control the order of ruleset execution.

The action that is executed when a rule fires may modify the set of facts in the knowledge base, for example, by adding a new fact, and thus cause the firing of other rules. The matching of the antecedents of rules to facts produces inference chains which indicate in what order the system used the rules to reach a conclusion. Inference chains can be displayed or recorded to help explain how a system reached its conclusions. Certainty factors can be associated with the rules. Such certainty factors can be combined according to predetermined formulas to assert the certainty of a conclusion. In this way, the certainty of a conclusion resulting from an inference chain is computed as a function of the certainties of the rules composing the inference chain, and certainty justification can become a part of the explanation of how a system reached its conclusions.

The interpreter 10-204 interprets the procedural statements embedded in the knowledge base rules and facts. The interpreter 10-204b also operates to execute subroutines required to carry out system operations (e.g. I/O, computations, etc.). In addition, interpreter 10-204b handles the interpretation of the programs called daemons that can be attached to various slots in an object using the mechanism referred to above as procedural attachment. Similarly, the program interpreter handles the programs called handlers which can be associated with the objects themselves. A handler program is a program whose sole function is to control a particular input, output or storage device, a file or an interrupt facility. The program interpreter 10-204b is also used to evaluate code resulting from the combination of the above methods when rulesets or rules containing procedural code are procedurally attached to slots or objects.

For the purpose of the present invention, inference engine 10-204 can be considered conventional in design and operate in the fashion described above. For example, it may be constructed similar to the inference engine included in the LOOPS system developed by Xerox corporation or the GoldWorks system developed by Goldhill Inc.

FIG. 3 illustrates the organization of objects within knowledge base 10-206. Overall, system control is carried out through seven separate control elements 302-1 through 302-7. As mentioned, these control elements are objects represented as frames which have a set of handlers. Messages are sent to these control elements during dump analysis. As indicated in FIG. 3, these control elements perform such functions as creating objects (i.e., object control 302-3), accessing information from a host memory dump (i.e., host control 302-6), accessing files on the local system (i.e., local control 302-1), generating explanations (i.e., explanation control 302-7), controlling the firing of rules (i.e., rule control 302-4), looking up known problems (i.e., known problem control 302-2) and in the case of a user interface for displaying menus and windows (i.e., display control 302-5).

As described herein, rule control 302-4 enables batch processing of memory dumps, thereby extending the level of automation.

As shown in FIG. 3, object control 302-3 creates objects by accessing classes of structures through an object 304-3 called data structure. Through this object, the system can access any operating system control structure for any version of a given operating system running on certain models of the computer systems which produce the memory dumps being analyzed. The control structures are organized into four basic classes. These include objects 305-1 through 305-5. The tables control structure 305-1 provides a number of tables, one of which is a code table object 306-1. The code table object 306-1 provides a list of codes and their associated values. One table is the reboot reason code table which gives English descriptions of reboot reason codes utilized by the different computer system models. The table corresponds to object 307-1.

The second class of control structure is a basic structure such as a hardware dedicated memory (HDM) structure and system control block (SCB) structure which are represented by objects 305-3 and 305-5. In the models of computer systems which produce dumps, there can be up to four processors, each is represented by a different HDM shown as objects HDM0 through HDM3, labeled 306-4 through 306-7 in FIG. 3. Also, since there is only one system control block, it is represented by object SCB1 labeled 306-9.

The third class of control structure is a queue type structure representative of a hardware resource which is organized into pools wherein each structure points in the pool until the end of the queue is reached. In the particular models of computer systems, the type of resource includes trap save areas (TSAs) and task control blocks (TCBs).

In FIG. 3, the TSA and TCB resources are shown as objects 306-2 and 306-3 labeled as TSA and TCB, respectively. Since the TSA and TCB resources are generated as a consequence of system operation, there is no minimum number of these resources that are required to be resident in a dump. Therefore, none are shown in FIG. 3 with the exception of object 307-2 shown in shaded form. As explained herein, this represents an instance of the object 306-2 which is generated by the knowledge representation module according to the teachings of the present invention.

The last class of data structures are indicator words 305-4, each of which is a hexadecimal word wherein each bit indicates whether certain functionality (hardware or software) is present within a given computer system model, or whether certain states exist in the computer system model or whether the structure is of a certain type. Included in this class are the indicator words contained in the system control block. These indicator words are represented by objects 306-7 through 306-10 labeled SCBn1 through SCBn4 in FIG. 3. Obviously, knowledge base 10-206 includes other objects representative of the other possible resources which can be found distributed in an unpredictable manner throughout a memory dump.

For further information concerning the types of operating system control structures reference can be made to the reference patent application and to a publication entitled "GCOS6 MOD400 and HVS6 PLUS Operating Systems Data Structures", copyright 1986, under number LP484.

OPERATION OF MAJOR COMPONENTS

Figure 16A:
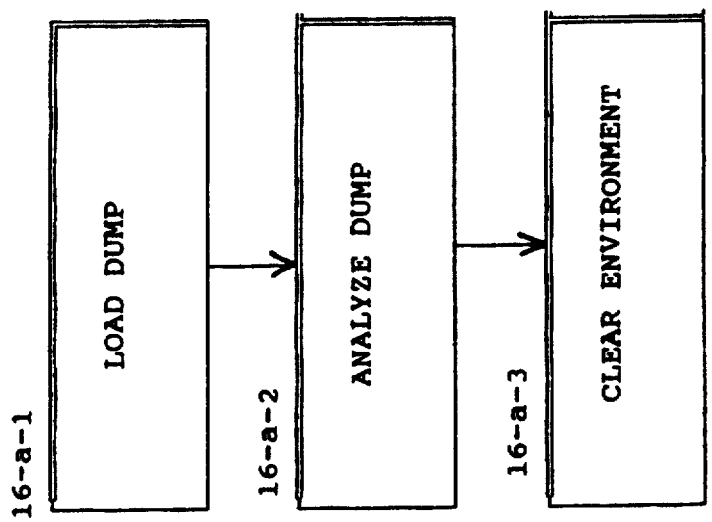

Before describing the operation of the system of FIG. 1, the extent of the level of automation achievable by the expert system of the present invention will first be described. FIG. 16a illustrates the operations performed by control module 10-202 on a single memory dump. For ease of discussion, these operations are described through the use of menus. As shown, block 16a-1 carries out the operations of specifying the memory dump, verifying that the memory dump specified is indeed a file of the proper type, and opening the memory dump file for reading.

Figure 16B:
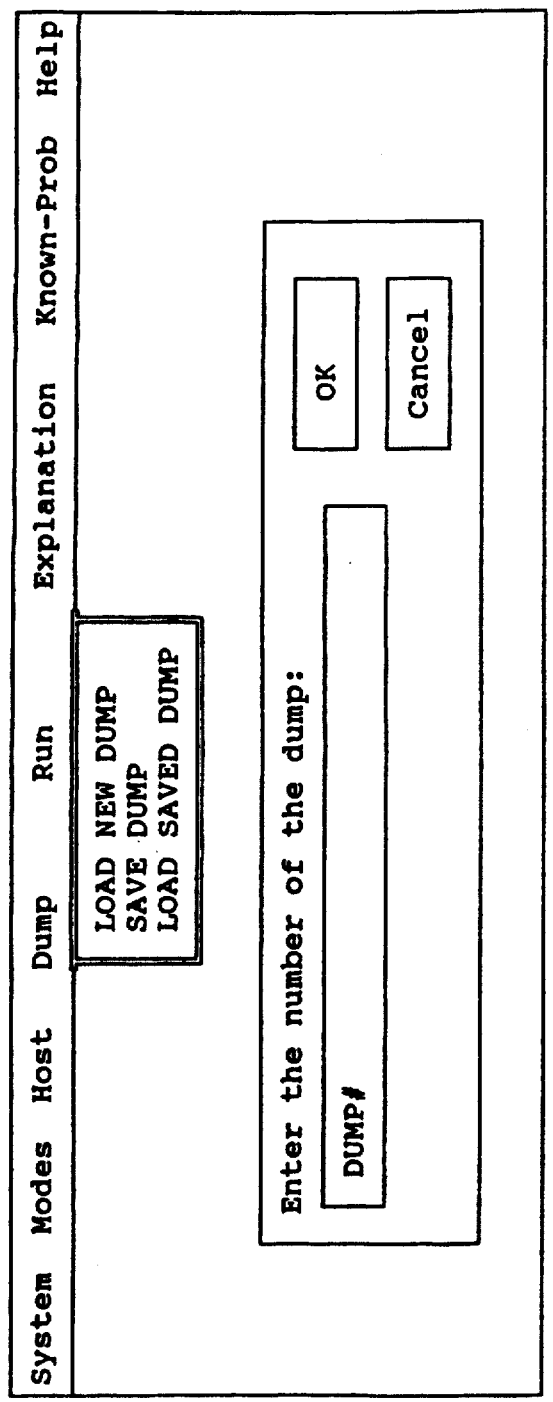
Figure 16C:
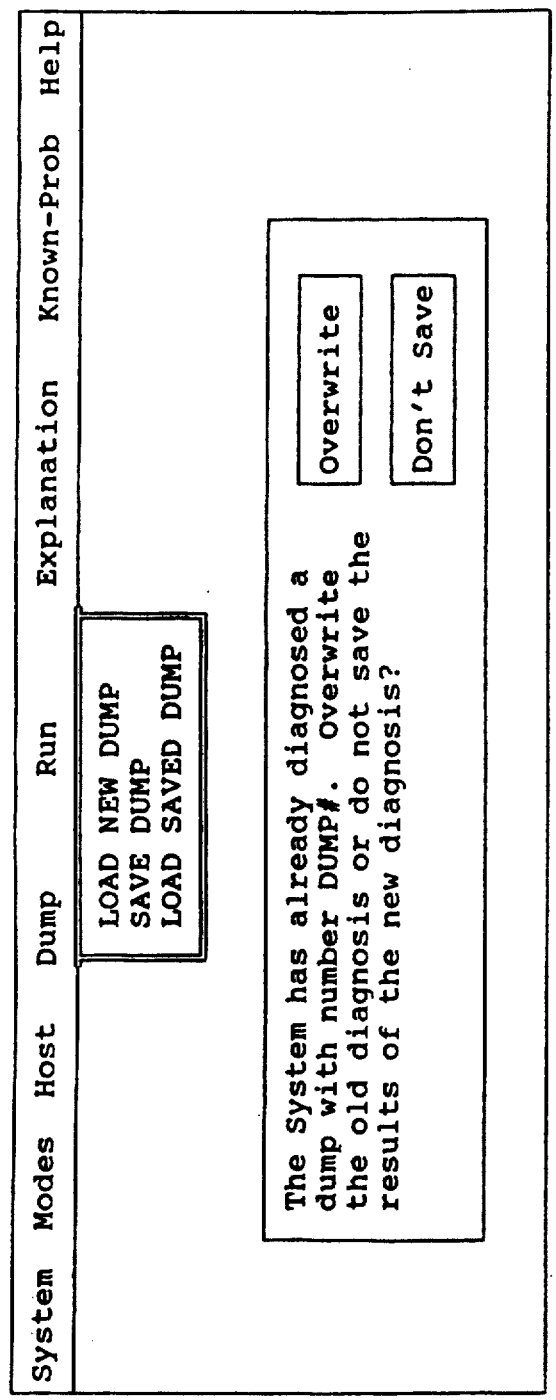

For example, as shown in FIG. 16b, the specification of the memory dump is carried out by the system obtaining the number designation (STAR) of the memory dump to be analyzed. The system checks its files to determine if it has previously processed the same memory dump. If it has, it then determines whether the new diagnosis should overwrite the existing diagnosis as illustrated in FIG. 16c.

Figure 16D:
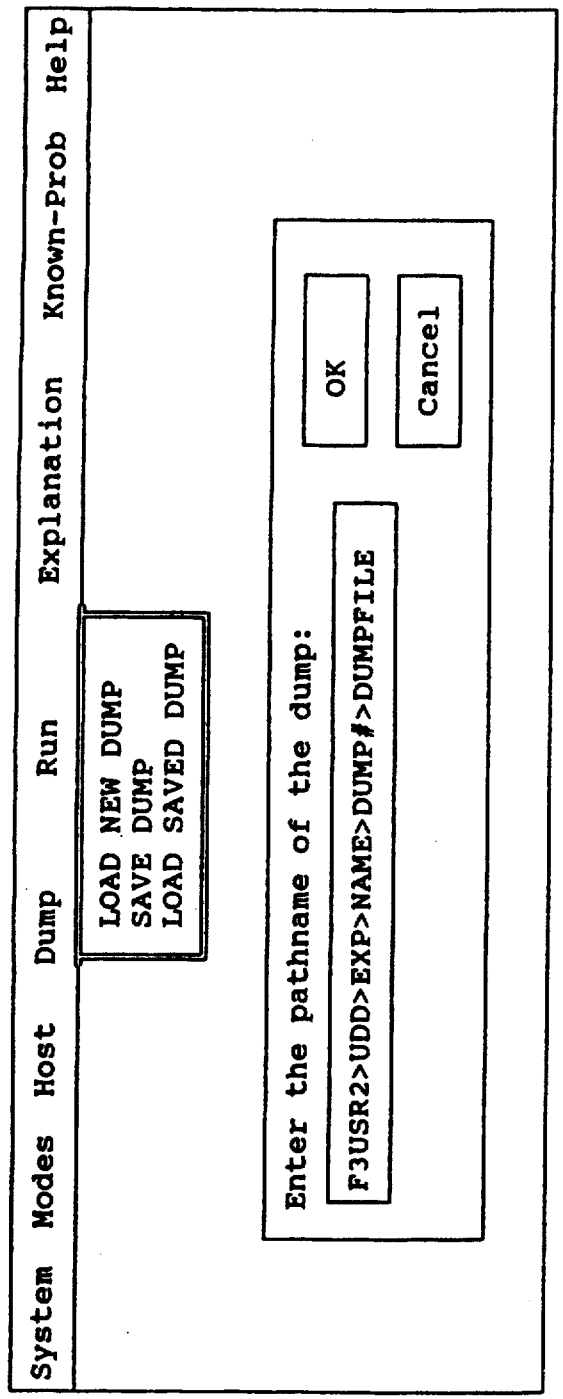

Up to this time, the system has done no processing of the memory dump until it obtains the pathname of the memory dump file from which portions will be transferred from the host system to be analyzed. This action is graphically illustrated in FIG. 16d.

Next, the system performs the dump analysis as described in FIGS. 7 through 14 and illustrated in block 16a-2 of FIG. 16a.

Figure 16E:
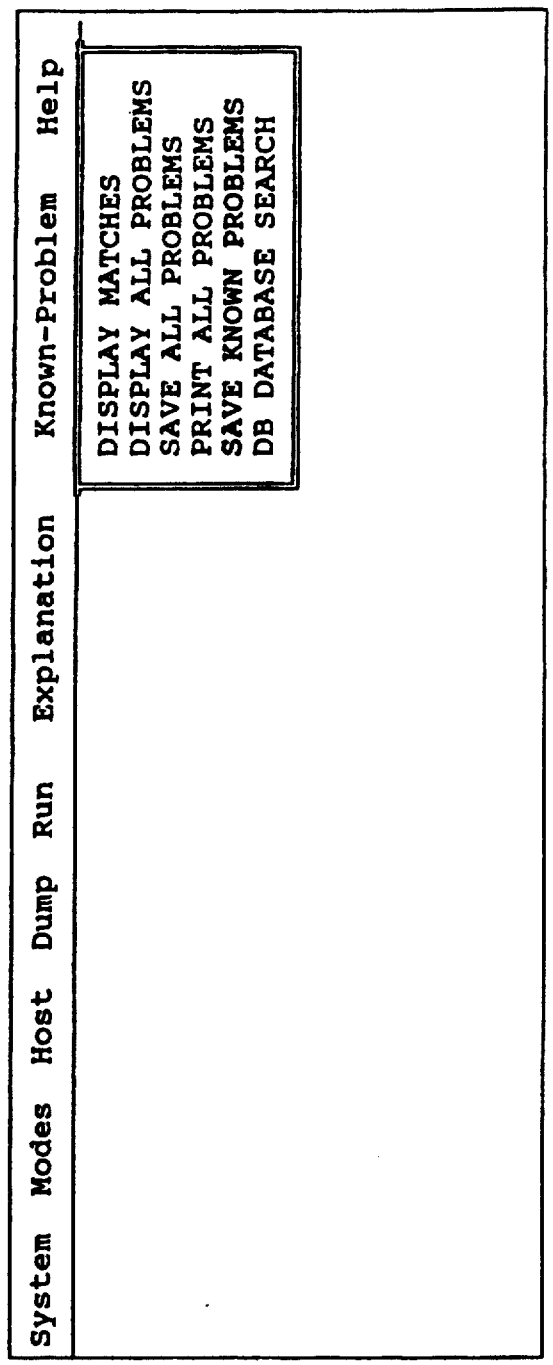

Then, the system provides for saving the results of the analysis in the known problem file. This action is illustrated in FIG. 16e. Obviously, this operation will only be used when the system allows human intervention.

Finally, block 16a-3 performs the operation of clearing the expert system's knowledge base of dump specific operating system control structure instances before attempting to load and analyze another memory dump as a function of the previously specified criteria.

Figure 17A:
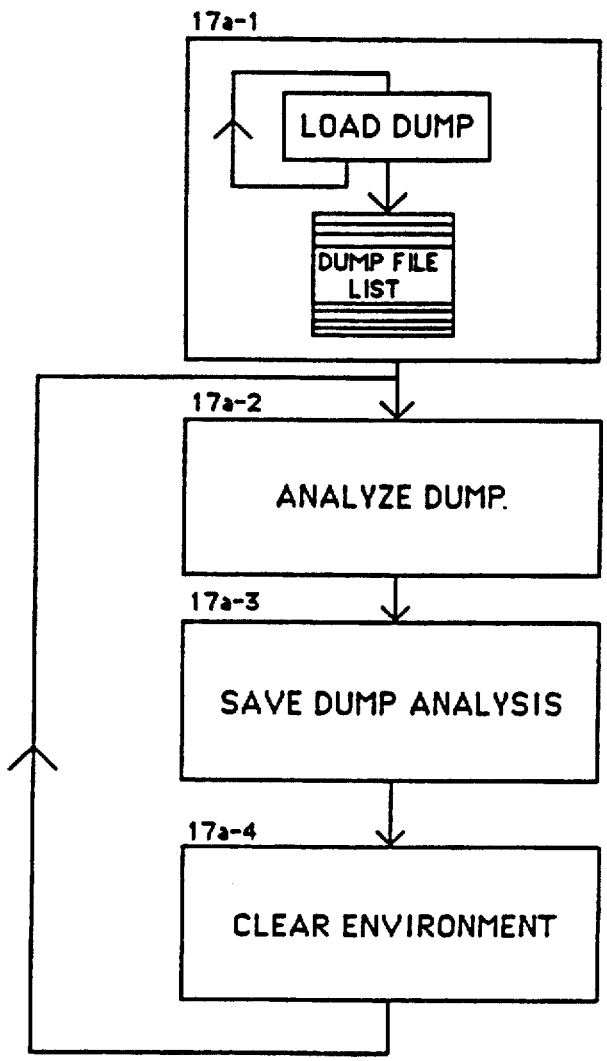
Figure 17B:
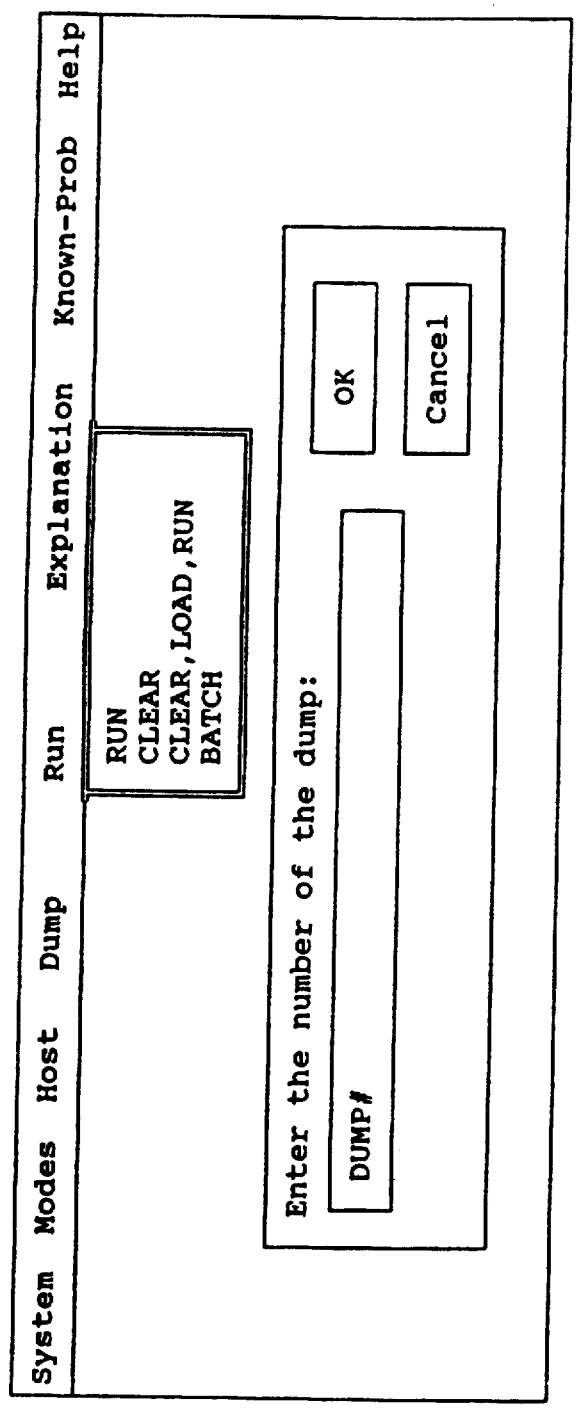
Figure 17C:
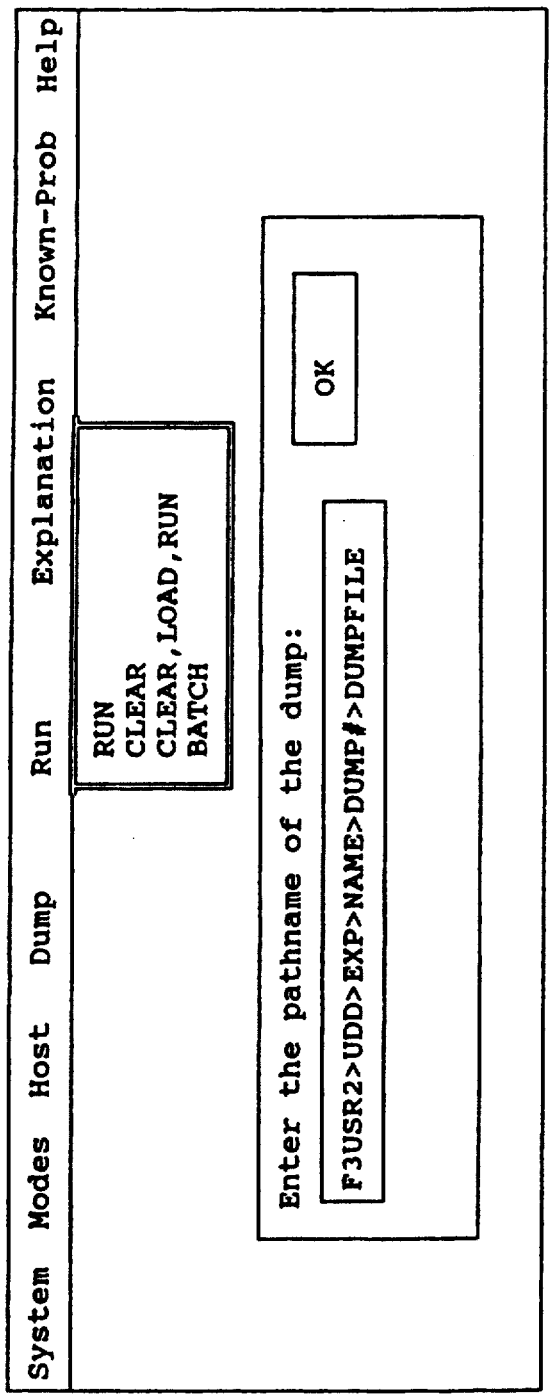
Figure 17D:
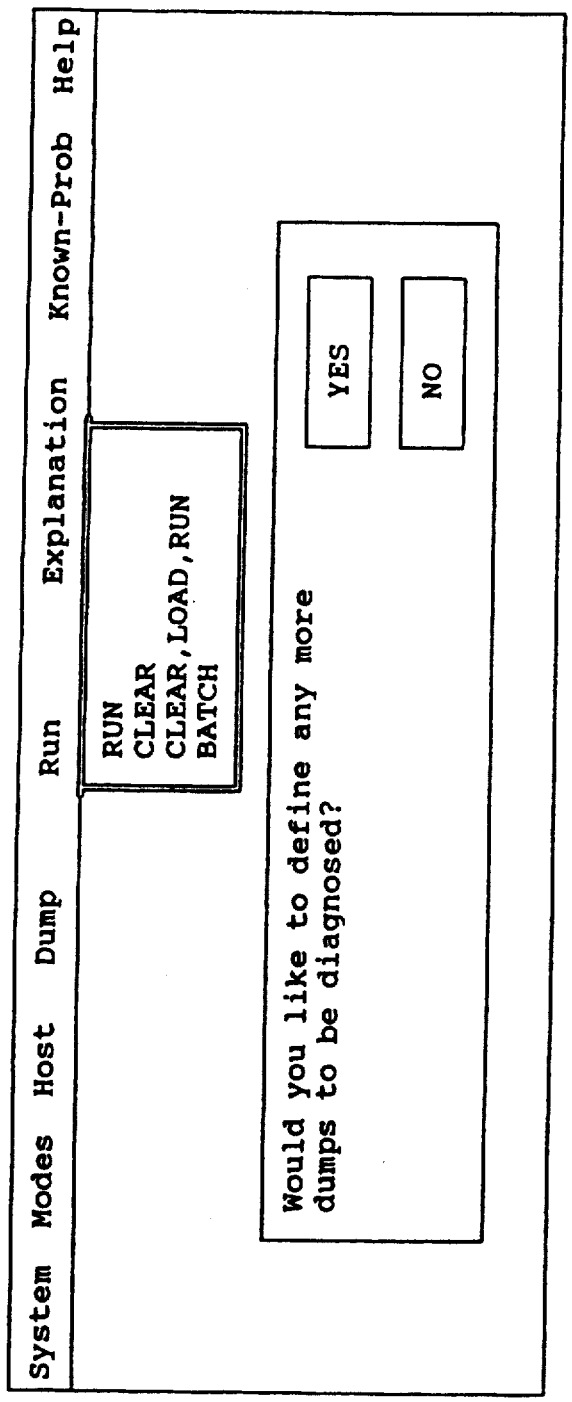
Figure 17E:
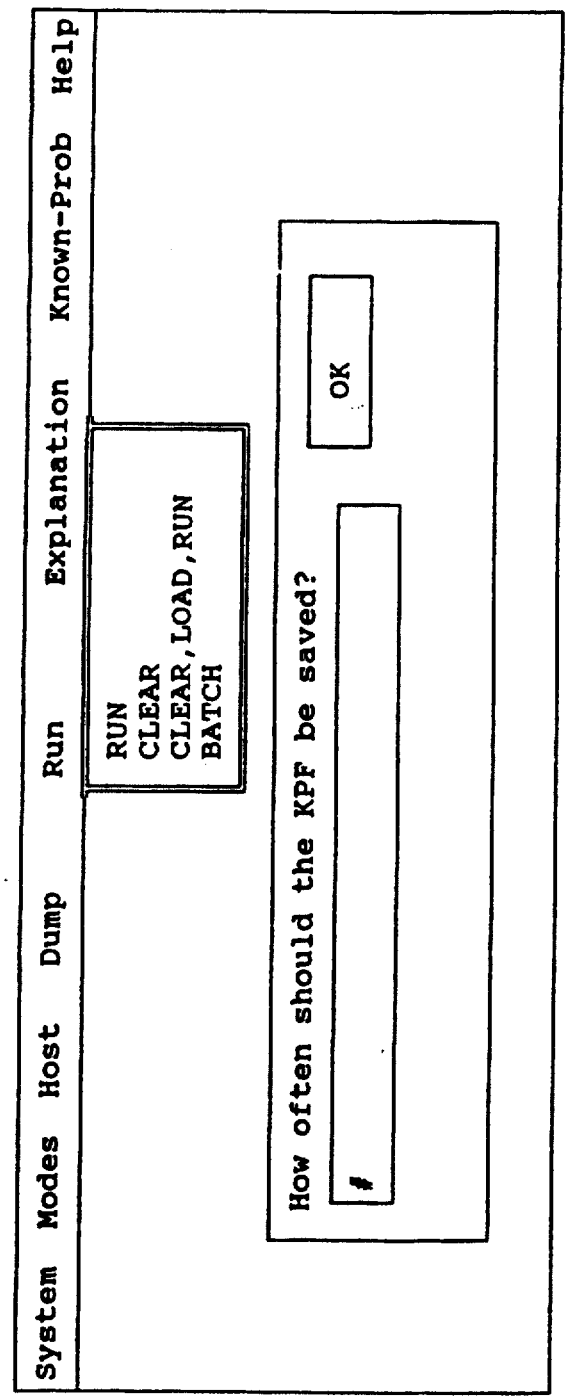

FIG. 17a illustrates the sequence of operations for batch operation in which the operations of FIG. 16a have been automated so as to enable the specification of a substantial number of dumps which are to be diagnosed in sequence. Block 17a-1 is a generalization of block 16a-1 in which the control module, loops to create a list of all memory dumps which are to be analyzed. Block 17a-2 as shown, performs the analysis on the first dump on the list and thus can be viewed as the functional equivalent of block 16a-2. Once the analysis is completed, block 17a-3 saves the results of the analysis in the known problem file (KPF). Block 17a-4 which corresponds functionally to block 16a-3, clears the knowledge base 10-206. Control is then returned to block 17a-2 to analyze the next dump in the list. The sequence of operations is then repeated until the entire list of memory dumps to be analyzed is exhausted. FIGS. 17b through 17e illustrate the type of specific criteria the system uses in carrying out the operations of FIG. 17a. The list of memory dumps to be analyzed is generated in block 17a-1 either by an interactive loop in which a user enters all of the dump files to be processed in (i.e. FIGS. 17b–17e) or by monitoring the remotely located host system for receipt of a request specifying a memory dump to be analyzed. In this second case, there can be a plurality of different remotely located host systems generating requests to the local expert system via link 10-4 for memory dumps to be analyzed. In such cases if the local system is ready, the request will be processed immediately. Otherwise, the request will be placed as an entry in the list of memory dumps to be analyzed which represents a queue or waiting list of requests. When the expert system completes its current request, it immediately starts processing the next request from the list. This process can be carried out ad infinitum should new requests arrive at about the same time that it takes the expert system to process a request.

The operation of the various major components of the system of FIG. 1 will now be described with reference to FIGS. 1 through 7.

As mentioned previously, the retrieval utility module 10-102 of FIG. 2 receives specific instructions from the local system to access a memory dump in the remotely located host system 10-1, retrieve a given amount of information starting at a predetermined location in the dump, format this information, and return it to the local expert system 10-2.

In the preferred embodiment of the present invention, requests for dump data are encoded in the LISP programming language by the expert system and transferred as LISP strings over communications link 10-4 through emulator 10-28 according to the KERMIT protocol. Such requests are received by the retrieval module 10-100 resident on host system 10-1. Typical requests are to open or close a memory dump, retrieve a given amount of bytes or words starting at a specific offset in a memory dump, retrieve a physical or virtual address from a memory dump, retrieve a pointer value from a memory dump, trigger debugging features, and retrieve a command line from a user, execute the command on the host system, and return the results of the command.

In brief, most requests include some form of retrieval of data from a memory dump. Retrieving data from a memory dump requires to specify the start address of the data to be retrieved and the number of bytes or words to be retrieved. Data retrieval is not always straightforward, since some addresses may need to be converted from virtual into physical address format. Furthermore, data retrieval from memory dumps is usually complicated by the fact that such files are not simple sequential text files consisting of ASCII characters, but are organized as a series of records of a given size (usually 256 or 1024 bytes), from which requested data must be extracted. Thus, retrieval module 10-100 has been designed to take these factors into account.

FIG. 4 depicts an extract of the contents of a memory dump. As can be seen, a typical memory dump contains a series of addresses, each containing up to eight hexadecimal digits. One request on the memory dump in FIG. 4 could be represented as "1 0000 10", which means retrieve 10 hexadecimal words (or 16 decimal words) from the current dump starting at address 0000. Such A request would return the following list of data when retrieved from the memory dump of FIG. 4: "83CO FFFE 006F E073 83CO 0608 FFFF FFFF FFFF FFFF 0000 0000 0000 0000 0000 0000". More generally, request presented as an input to the retrieval module 10-100 can be viewed as a function call with certain parameters. The retrieval module accepts the following types of request as inputs:

1. EXIT without parameters;
2. SENDPHYS with a start address as a hexadecimal number and a length also as a hexadecimal number to retrieve a physical address from a dump;
3. SENVIRT with a start address, a length, and a map (called dsbra, and used in computing a physical address from a virtual one) all three as hexadecimal numbers, to retrieve a virtual address from a dump;
4. OPENFILE with a filename as a symbol and a record size as an integer, to open a memory dump for retrieval;
5. TOGGLEDG without arguments, to create a toggle that turns debugging print statements on and off;
6. TRANSLATE with an address and a map both as hexadecimal numbers, to translate virtual addresses to physical ones;
7. HVSESC with a command line as a string, to performs a host command;
8. SENDLDBU with an address as a hexadecimal number, to get from a dump the list of all the loaded bound units (modules) in the system at the time of the dump;
9. OPENTRAC with a file name as a symbol, to open a trace file to obtain a debugging script;
10. WRITTRAC with a text line as a string, to write a text line in a trace file for debugging purposes;
11. CLOSTRAC without argument, to close a trace file;
12. CLOSFILE without argument, to close a dump file;
13. UNASVIRT with a start address and a length both as hexadecimal numbers, to get a virtual instruction from a dump and disassemble it.

The output of the retrieval module is almost always either a list of the instructions that were retrieved by request, or of the assembly code for such instructions in the case of the UNASVIRT command. A string is returned instead of a list when the retrieval module encounters an error.

In any case, once a string, such as the one in the above example is retrieved from a memory dump, it is returned by the retrieval module to the local expert system 10-2 and is transformed into a LISP list or string for use by the expert system. For the purposes of the present invention, the above conversion can be considered to be performed in a conventional manner.

The knowledge representation module 10-222 accepts requests from the control module 10-202 of FIG. 2 for a control structure contained in the memory dump being processed and searches the knowledge base 10-206 for one that matches the request. In the event such a structure is already present in the knowledge base, the knowledge representation module 10-222 simply returns parts of or the whole control structure in response to the request. Alternatively, when the control structure does not exist in the knowledge base, the knowledge representation module 10-222 then transfers control to the retrieval module 10-100 passing along the request received from control module 10-202. The retrieval module 10-100 responds to the request by returning a series of values as a LISP string as described above. The knowledge representation module 10-222 retrieves the corresponding operating system control structure from the knowledge base, fills this control structure with the actual values received, and links this updated structure to the ones already stored in the knowledge base.

Figure 5:
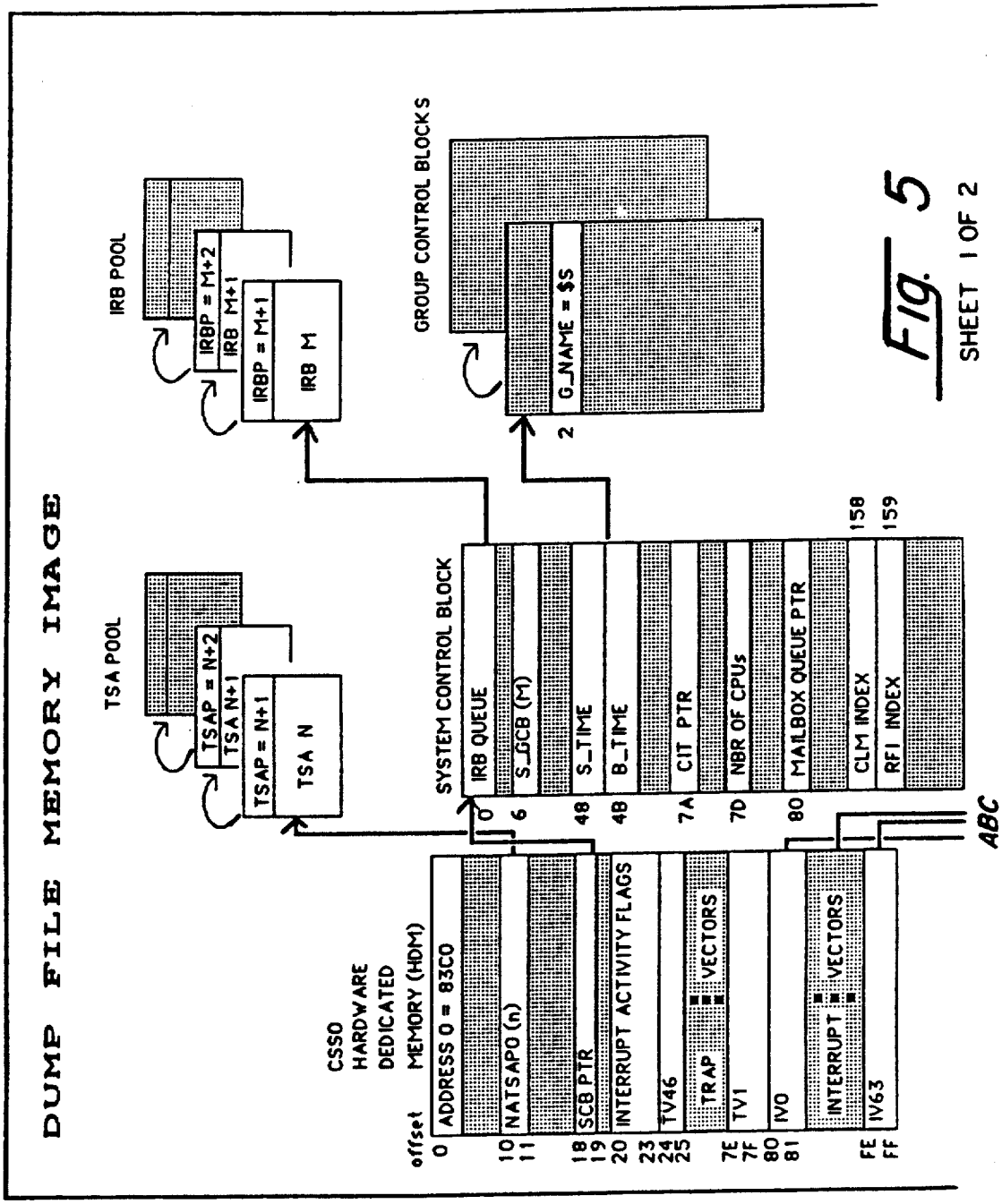
FIG. 5 is a diagram illustrating the hierarchical organization of the operating system control structures contained within a specific memory dump.

Once the knowledge representation module 10-222 is in possession of an "instantiated control structure," it returns parts of or the whole structure to the control module in response to the original request. FIG. 5 illustrates an overview of the hierarchy of operating system structures stored in the memory dump of FIG. 4. FIG. 6 shows a Hardware Dedicated Memory, control structure containing the corresponding values from the dump.

As explained earlier, the control module 10-202 calls on the knowledge representation module 10-222 of FIG. 2 with a request for data representing an operating system structure. When the request is answered by the knowledge representation module 10-222 as described above, the control module 10-202 makes assumptions based on the information contained in the structure received, makes requests for other operating structures, displays information about them to the user, and derives conclusions about the problem at hand.

Figure 7:
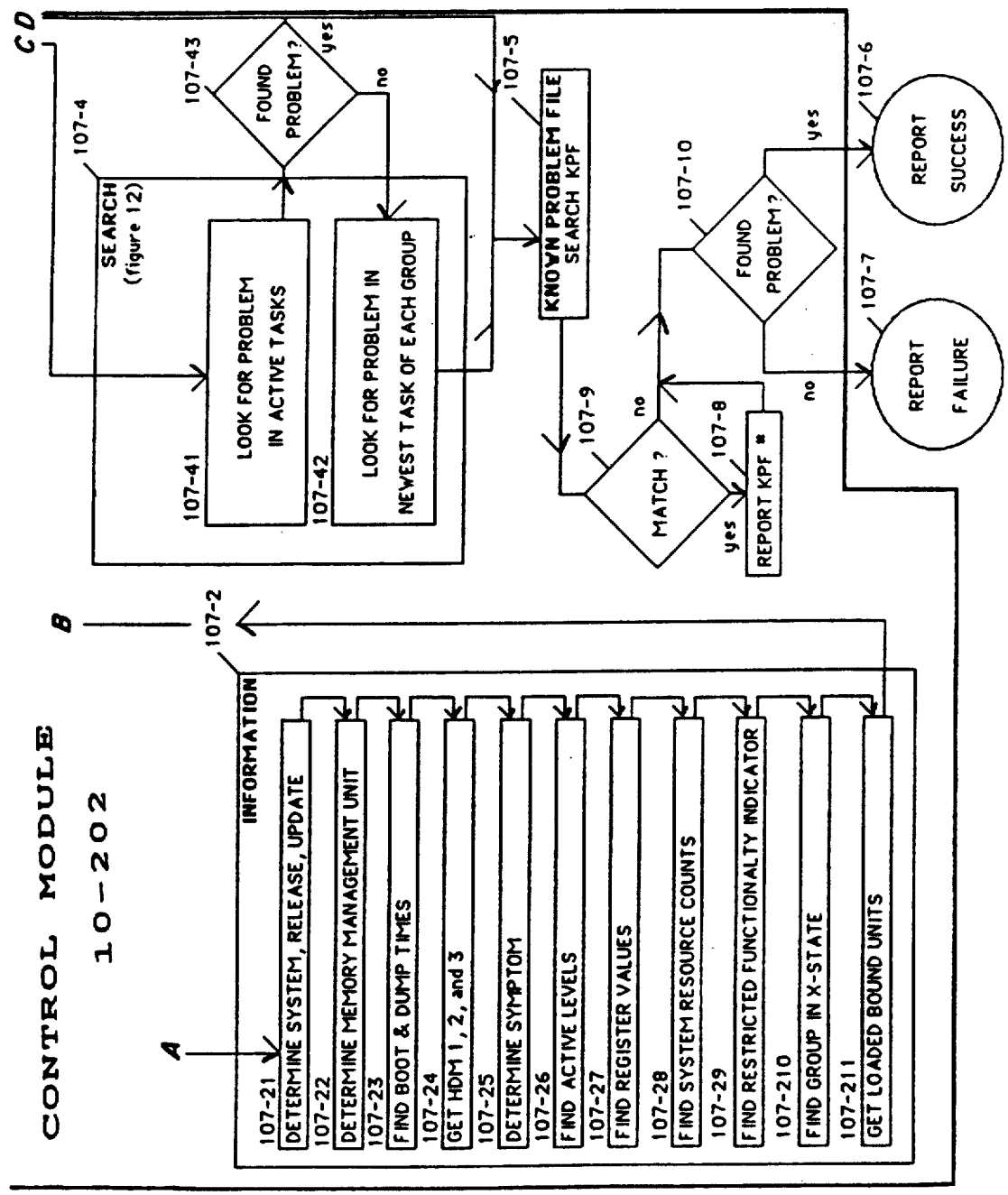
FIG. 7 shows in greater detail, the organization and operation of the control module of FIG. 2.
Figure 9:
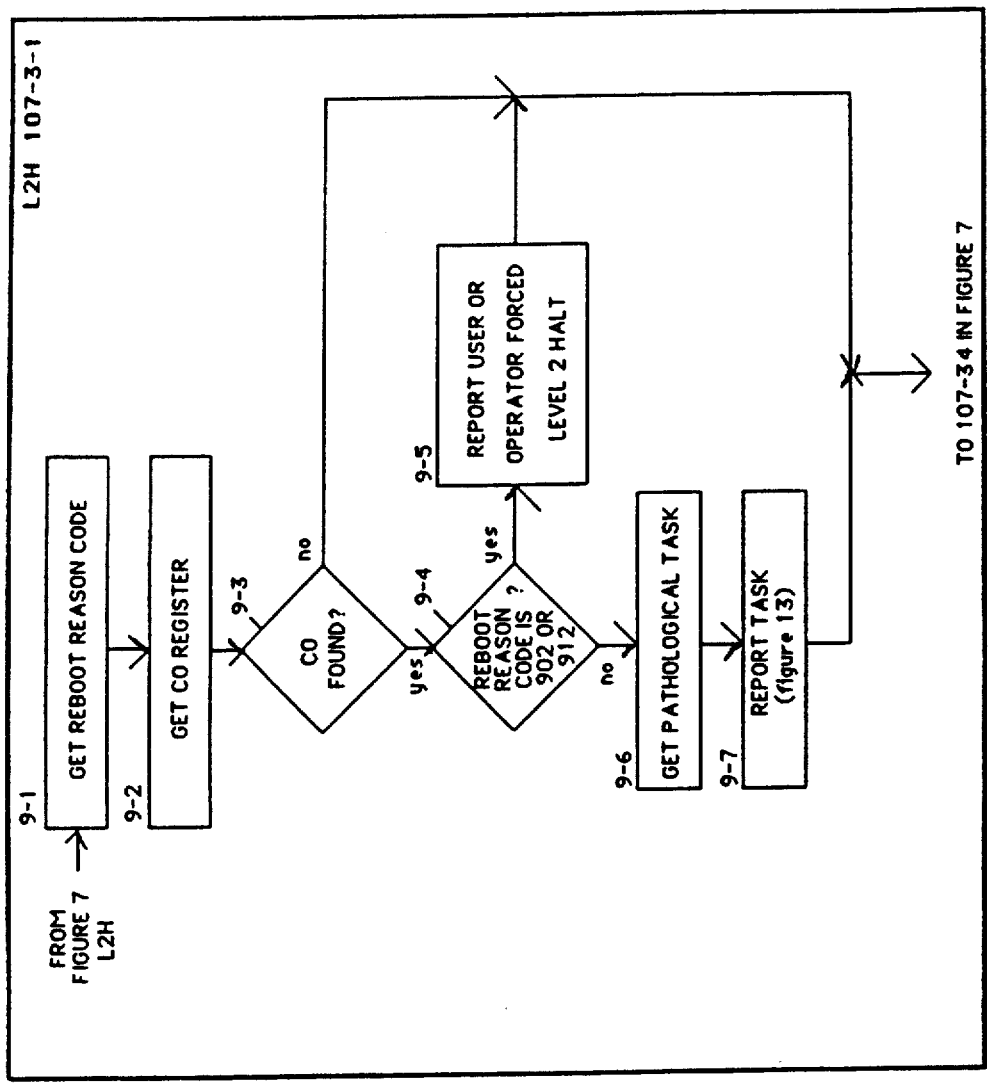
FIGS. 9 through 14 show in greater detail, the organization and operation of different modules of FIG. 7.
Figure 10:
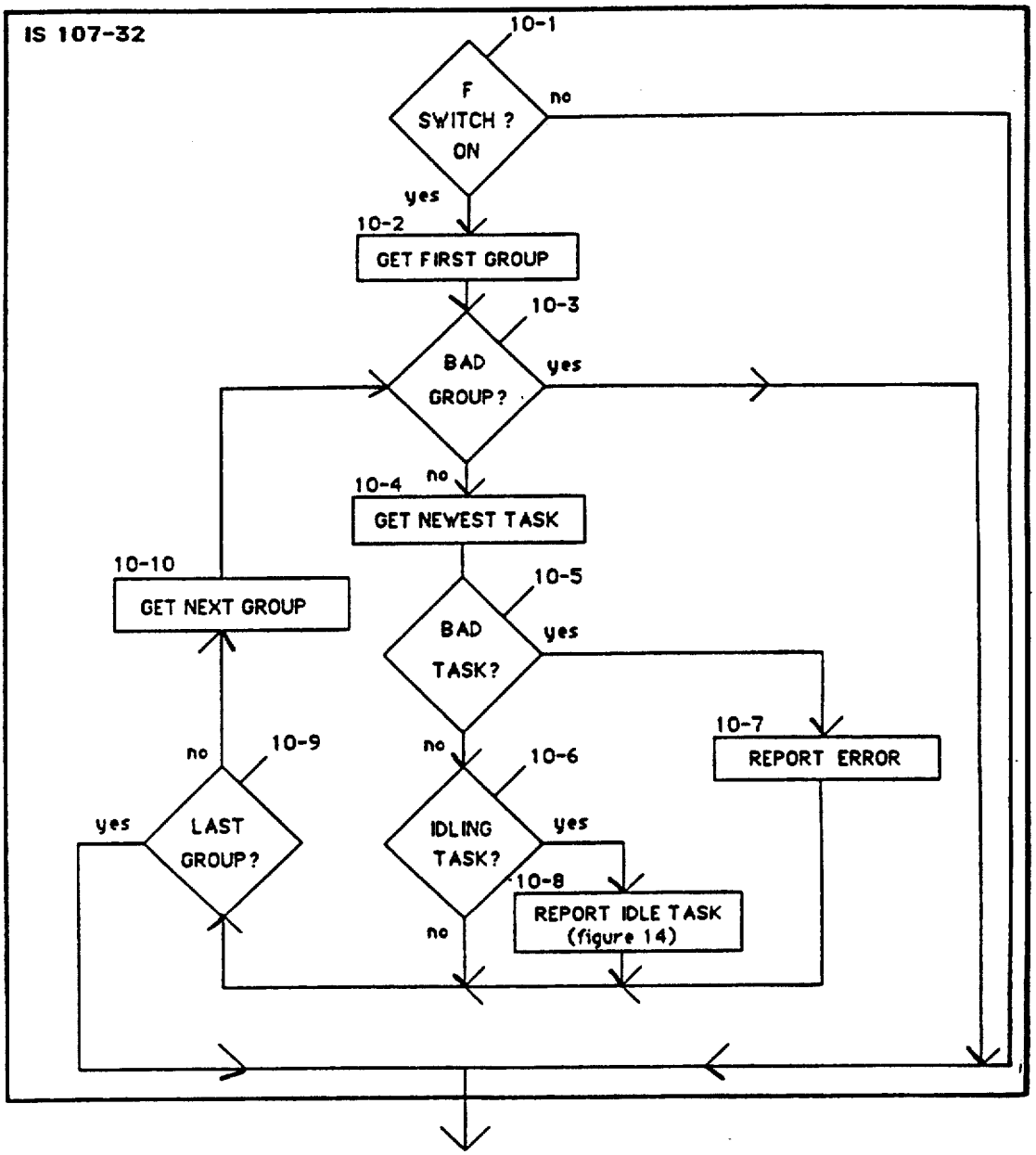
Figure 11:
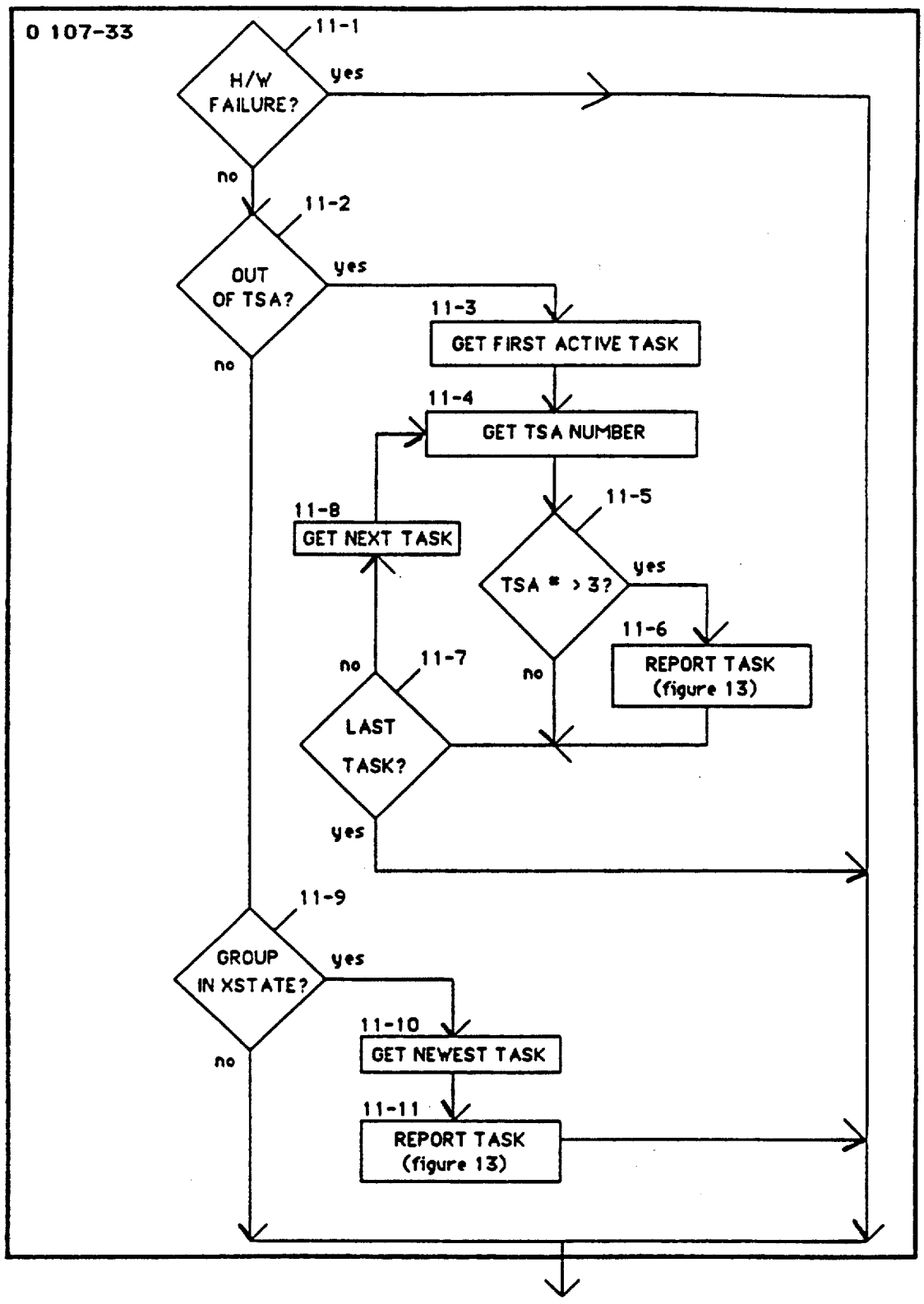

FIG. 7 is a block diagram that illustrates the organization and operation of the control module 10-202 of FIG. 2. Before discussing the contents of FIG. 7, it is useful to point out that each computer system model whose memory dumps are being analyzed divides the jobs that want to run into program groups (as is conventional), each group consisting of a number of tasks. Each of the operating systems of the given computer system models provides a number of active levels (priority levels) at which the tasks can run. The program groups are assigned certain priority levels and, once a program group is enabled, the tasks or programs in this group are enabled to use the system resources to execute such tasks. These levels are associated with the interrupts in the system. The task or program being executed may be interrupted by an event assigned a priority level greater than the level of the current task or program being executed.

In order to be executed, a task must change its current level from the group's to the level at which tasks can be executed. Once a task has completed its execution, it changes its level back to the level of that task's group, and another task, possibly from another group, is allowed to execute at the level just freed. The operating system first runs tasks located on the lowest level, then tasks located at the next higher level, and so on until it reaches tasks at the highest level. Due to group priorities, tasks awaiting execution may continuously replace the task that finished executing at a given level and tasks located at higher levels may never be allocated system resources to execute unless pre-emption is used to alter the group priorities.

During such operations, information relating to levels, interrupts, etc. are stored in the different operating system control structures. In general, the control module 10-202 will attempt to locate the group and task that caused the problem which forced the computer system to execute a dump.

As shown in FIG. 7, the control module 10-202 is organized from a ruleset viewpoint into four major components. These are a validity module 107-1, an information module 107-2, a diagnosis module 107-3, ad a search module 107-4. The validity module 107-1 determines if the dump and the control structures contained within the dump are valid so as to be useable for analysis and diagnosis.

The information module 107-2 operates to generate general information about the memory dump that is used in generating explanations which are saved in the known problem file, and in carrying out the rest of the diagnosis in terms of selecting, among the major symptoms, the one that caused the problem. As mentioned, the major symptoms represent the basic hardware states or conditions which a computer system can assume. In the preferred embodiment, there are three major symptoms which correspond to the following conditions:

1. A Halt—A condition wherein the operating system detected a serious problem and brought the system to a halt;
2. Idle State—A condition wherein the operating system was idle when it should have been processing user requests which resulted in the dump being performed followed by a system reboot operation;
3. Other—A condition wherein the operating system detected a problem which was neither a Halt nor an Idle State.

Once module 107-2 diagnoses the major symptom it hands over control to diagnosis module 107-3. The diagnosis module 107-3 includes a number of submodules containing rulesets designed to specifically find the cause of a problem based upon a particular major symptom. Each ruleset is divided into a number of rule subsets which correspond to subsymptoms of the major symptom. As seen from FIG. 7, the subrulesets include submodules 107-31, 107-32 and 107-33 which are shown in greater detail in FIGS. 9 through 14.

When diagnosis module 107-3 is unable to identify the problem, it passes control to search module 107-4. This module contains rulesets 107-41 and 107-42 for searching for a problem in all of the active tasks and then in the newest task within each program group. When a problem is found, diagnosis module 107-3 passes control to a known problem file module which includes rulesets for searching the known problem file for a similar problem previously diagnosed and for which a solution already exists.

As seen from FIG. 7, in locating the problem the control module first calls Block 107-1 to check the validity of the main operating system structures contained in the memory dump. Block 107-11 checks the validity of the Hardware Dedicated Memory (HDM). Block 107-12 checks the validity of the System Control Block (SCB). Block 107-13 checks the validity of the memory dump by comparing its size to that of the high memory address of the operating system. Since a dump represents a frozen picture of the system at the time of the crash, the size of a dump should be equal to the highest address of the operating system.

If some of the validity checks fail, module 107-1 generates the corresponding error message to the system or user and attempts to continue. Once validity module 107-1 completes all of the validity checks, it passes control to information module 107-2 which displays dump information to the user.

The control sequencing inside of module 107-2 passes sequentially through submodules 107-21 through 107-211. Submodule 107-21 finds the type, release, and update of the system being diagnosed to locate the proper system programs that may need to be examined and to determine if the computer system model that created the dump needs an upgrade because a problem that appeared in an old version may have been fixed by a later version.

Submodule 107-22 determines the type of memory management unit currently being used by the operating system so that the rest of the control module will be able to use the proper algorithm to properly translate virtual addresses into physical addresses.

Module 107-23 retrieves the system boot and dump times and compares them in order to determine if the computer system crashed during or after the boot, each case requiring different recovery procedures. Since the operating system being analyzed can have up to four processors (CPUs), and since there is one HDM structure for each CPU, module 107-24 retrieves the other HDMs that may exist in the system. Module 107-25 then determines the major symptom of the problem: Level 2 Halt (L2H), Idle State (IS), or Other (0). This determination is performed by using information from the interrupt activity flag table, located at offset 20 (hexadecimal number) of the HDM shown in FIG. 6. Module 107-26 retrieves the active levels for each CPU, i.e., the levels at which tasks were being executed at the time of the crash.

Module 107-27 retrieves the contents of the register values that were saved immediately prior to the crash since these values will be useful in locating the problem. Module 107-28 then determines the number of Trap Save Areas (TSA) and Internal Request Blocks (IRB) used to see if the operating system ran out of these resources which would explain the crash, thus limiting the analysis to searching for the task or tasks monopolizing all of the system resources.

Module 107-29 determines the Restricted Functionality Indicator (RFI) which is used in some cases to limit the amount of possible sources of the problem. Module 107-210 attempts to find a group (defined by a group control block) in a faulty state, thereby stopping other groups from sending their tasks for execution and thus monopolizing the system. Finally, module 107-211 returns the names of all of the bound units (BU) loaded in the system at the time of the crash. Since these BUs name the programs actually running on the system, they are used to retrieve the code of these programs within the memory dump stored on the host system to locate the specific instruction that caused the machine to halt once the cause of the problem has been reduced to one BU.

Control is then transferred to diagnosis module 107-3. Module 107-3 redirects control to modules 107-31, 107-32, or 107-33 as a function of the major symptom of the problem (i.e., L2H, IS, or 0 condition, respectively). If the symptom is an L2H condition, module 107-31 determines the reboot reason code, the task that caused the L2H, if useful, and sequences to module 107-34 if the determination of the task fails. The organization and operation of module 107-31 are shown in greater detail in FIG. 9.

If the symptom is an IS condition, module 107-32 searches through each system group looking for a task that is waiting for a resource or holding one. It provides resource information for each task, including information indicating if the resource count is high or low. The organization and operation of module 107-32 are shown in greater detail in FIG. 10. As can be seen from FIG. 10, block 10-1 initiates the processing of an IS condition by verifying that the "F switch" of the system group is turned on. This switch indicates that the system attempted to force a L2H condition upon encountering an error. If turned off, this switch indicates that the system has encountered an error and was unable to go to a L2H condition. In such as case, the problem can not be qualified as an IS condition any longer, and the system aborts the processing of the IS condition, passing control to module 107-34 in FIG. 7. When the switch is turned on, block 10-2 proceeds onto the examination of the queue of all system groups and retrieves the first group in this queue. Then, block 10-4 retrieves the newest task running in the group to verify whether this task was idling or not via block 10-6. If errors such as a bad task or group occur during retrieval, blocks 10-3 and 10-5 are called. Block 10-3 ca;ses an exit from the IS condition and redirects control to module 107-34 of FIG. 7 upon encountering a bad group since this prevents block 10-10 from following the chain of all system groups any further. Block 10-5 redirects control to block 10-7 for error reporting when a bad task is encountered. However, processing can subsequently resume with the next group in the queue. When no such errors are encountered and the newest task in the group currently under scrutiny appears to be idling, block 10-8 reports detecting the idle task. Block 10-8 is described in greater detail in FIG. 14.

If the symptom is neither a L2H nor an IS condition, control is transferred to module 107-33 which checks for a hardware failure, a shortage of system resources, or for a system group in an faulty state condition. The organization and operation of module 107-33 are shown in greater detail in FIG. 11. Block 11-1 checks for a hardware failure. If such is the case, the problem is found and processing leaves block 107-33. Otherwise, block 11-2 verifies that the system has not run out of Trap Save Areas (TSA). If a TSA problem exists, block 11-3 retrieves the first active task, calls block 11-4 to find the number of TSAs the task uses, tests if this number is reasonable via block 11-5, and reports the task via block 11-6 if the number appears to be unreasonable. Block 11-7 checks if any active task remains and repeats this process via block 11-8 which fetches the next unprocessed active task. When all active tasks have been processed in this way, control leaves module 107-33 to module 107-34. However, if block 11-2 does not discover a lack of TSAs, block 11-9 is called upon to determine if a group is in a faulty state. If no such group exists, module 107-33 is abandoned for module 107-34. Blocks 11-6 and 11-11 on task reporting are described in more detail in FIG. 13.

Module 107-3 starts to operate from a major symptom, and decomposes this major symptom into subsymptoms. Subsymptoms are more detailed specifications of the problem that can be used to differentiate the current problem from previously diagnosed ones, to classify the current problem as one that has been encountered before, or to report a type of problem for which the system has no solution.

Figure 12:
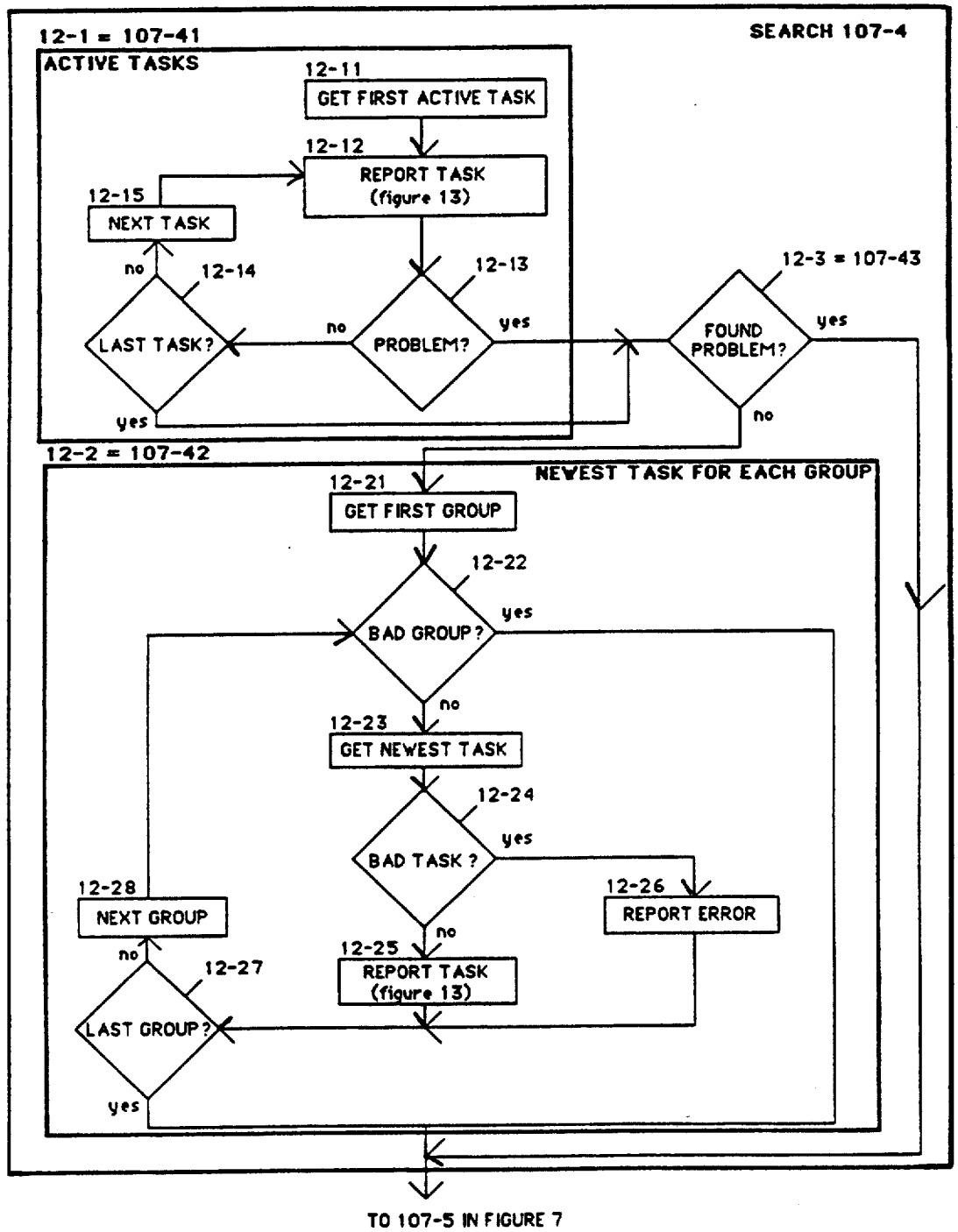

If no problem has been found by module 107-3, control is passed to module 107-4. Otherwise, module 107-4 is bypassed. The organization and operation of module 107-4 are shown in greater detail in FIG. 12. This module searches for a problem in all of the active tasks 107-41 and then in the newest task of each group 107-42. In FIG. 12, blocks 12-1 and 12-2 correspond exactly to modules 107-41 and 107-42 of FIG. 7. The function of block 12-1 is to loop over all active tasks. Block 12-11 retrieves the first active task, which is then reported via block 12-12. Block 12-13 checks for a problem in the task. If a problem is found, the loop is terminated and block 12-1 is exited. Otherwise, the loop continues and block 12-14 tests for the presence of other active tasks, using block 12-15 to fetch the next active task if such a task exists. In all cases, the loop is eventually exited and a check for a problem is performed by block 12-3. If a problem is detected by block 12-1, processing leaves module 107-4. Otherwise, block 12-2 is called upon to search for a problem in the newest task of each system group. The function of block 12-2 is to loop through all system groups. For each such group, block 12-23 fetches the newest task in the group and block 12-25 reports this task (as described in greater detail in FIG. 13). Blocks 12-22 and 12-24 handle bad tasks and groups respectively, using block 12-26 to report task errors. Blocks 12-21, 12-28, and 12-27 perform the initialization, iteration, and termination condition of the loop, respectively. In all cases, control leaves block 107-4 whether or not a problem is detected. Blocks 12-12 and 12-25 on task reporting are described in greater detail in FIG. 13.

When a problem is found, control is passed to module 107-5 which searches a known problem file (KPF) for a similar problem corresponding to a dump which has been previously diagnosed and for which a solution already exists.

During the course of a diagnosis, the problem under scrutiny is specified little by little as the diagnosis progresses. This leads to a description of the problem which includes its major symptom, subsymptoms, and other information pertaining to the problem, such as the reboot reason code for an L2H condition and other such data. This description is then stored in the KPF. When the diagnosis is completed, the only trace of its occurrence is such a description, now stored in the KPF for the duration of the session. This description can be stored permanently if the system or user specifies saving the KPF before terminating a session. After many diagnoses have been run, many problem descriptions exist in the KPF.

When a new diagnosis is run, a new description is created and compared against the ones that exist in the KPF. The search for a known problem thus consists in looking for a match between the current problem and a previously diagnosed problem. The matching is performed using the descriptions for each problem. The data elements that constitute these descriptions have numeric weights associated with them. When a description is being created during a new diagnosis, a weight is associated with each data element of the evolving description. The arithmetic sum of the weights of all the data elements in a description constitutes the weight of the description. When performing matching, module 107-5 creates a "template" for each KPF description and initializes its weight to 0. Then it looks at each data element in the current problem description and attempts to find it in each KPF description. If it finds it, the weight of that data element is added to the weight of the templates of each KPF description in which the data element was found.

When each data element of the current description has been processed as described, module 107-5 is in possession of as many weighted templates as there are KPF problem descriptions. A match between two descriptions is deemed to have occurred if their total weights are within 10% of each other. Accordingly, to determine which templates really constitute a match, module 107-5 compares the weight of the current problem with the weight of each template. Module 107-5 adds the template to the list of matches when the arithmetic difference between the two weights does not exceed 10%. It will be appreciated that various operations can be performed on the KPF. That is, problem descriptions can be added, deleted, displayed, and updated; solutions and comments can be associated with a problem description; searches of the KPF can be requested for a specific problem.

If one or more matches between the current dump and a known problem exist, as tested by module 107-9, they are reported by module 107-8. Whether a match exists or not, if the problem has been found, the control module reports a successful diagnosis via module 107-6. Otherwise, if the problem could not be located, the control module reports a failure via module 107-7. In both cases, the diagnosis is deemed completed and control module operation is terminated.

Figure 13:
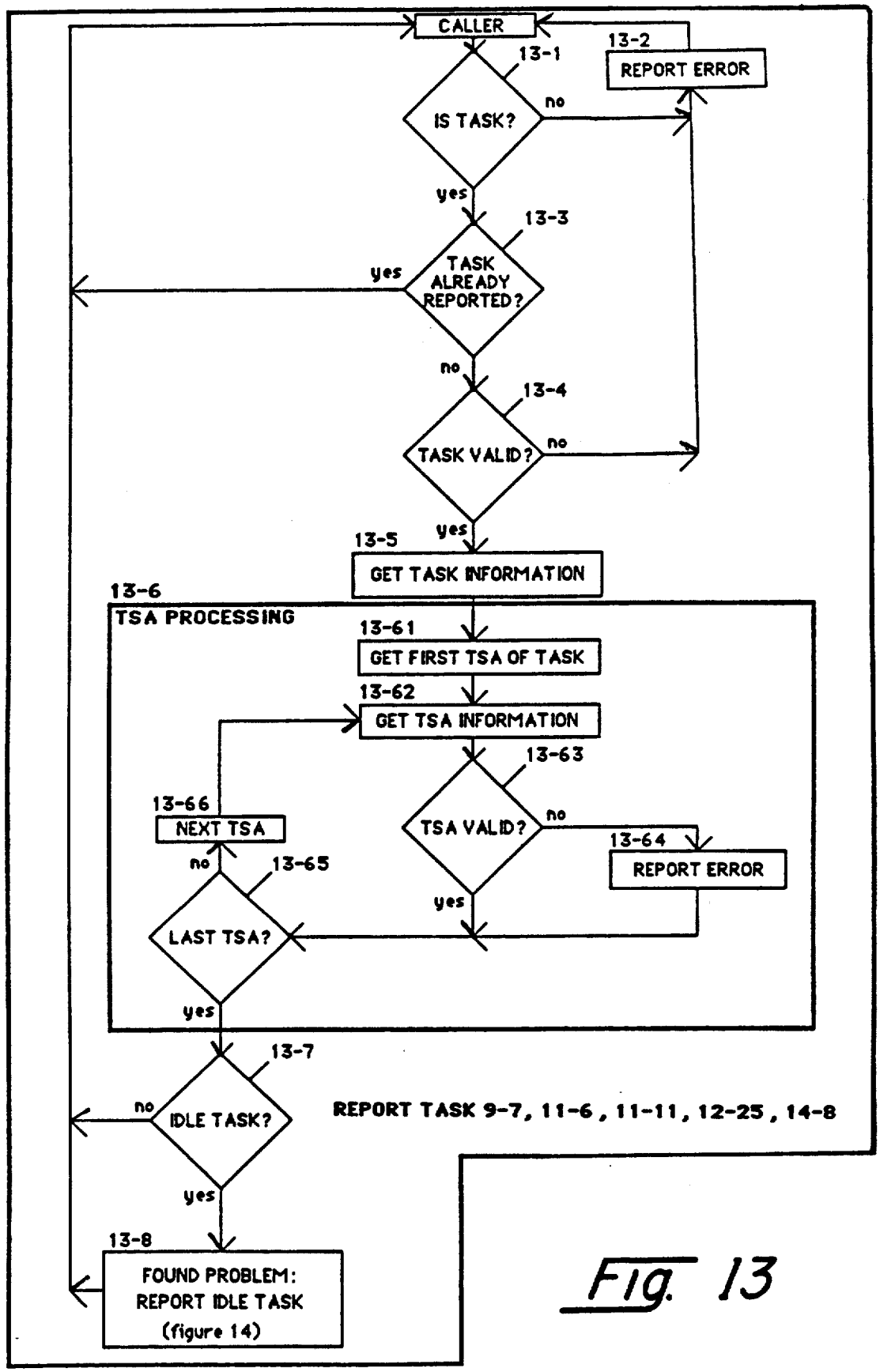
Figure 14:
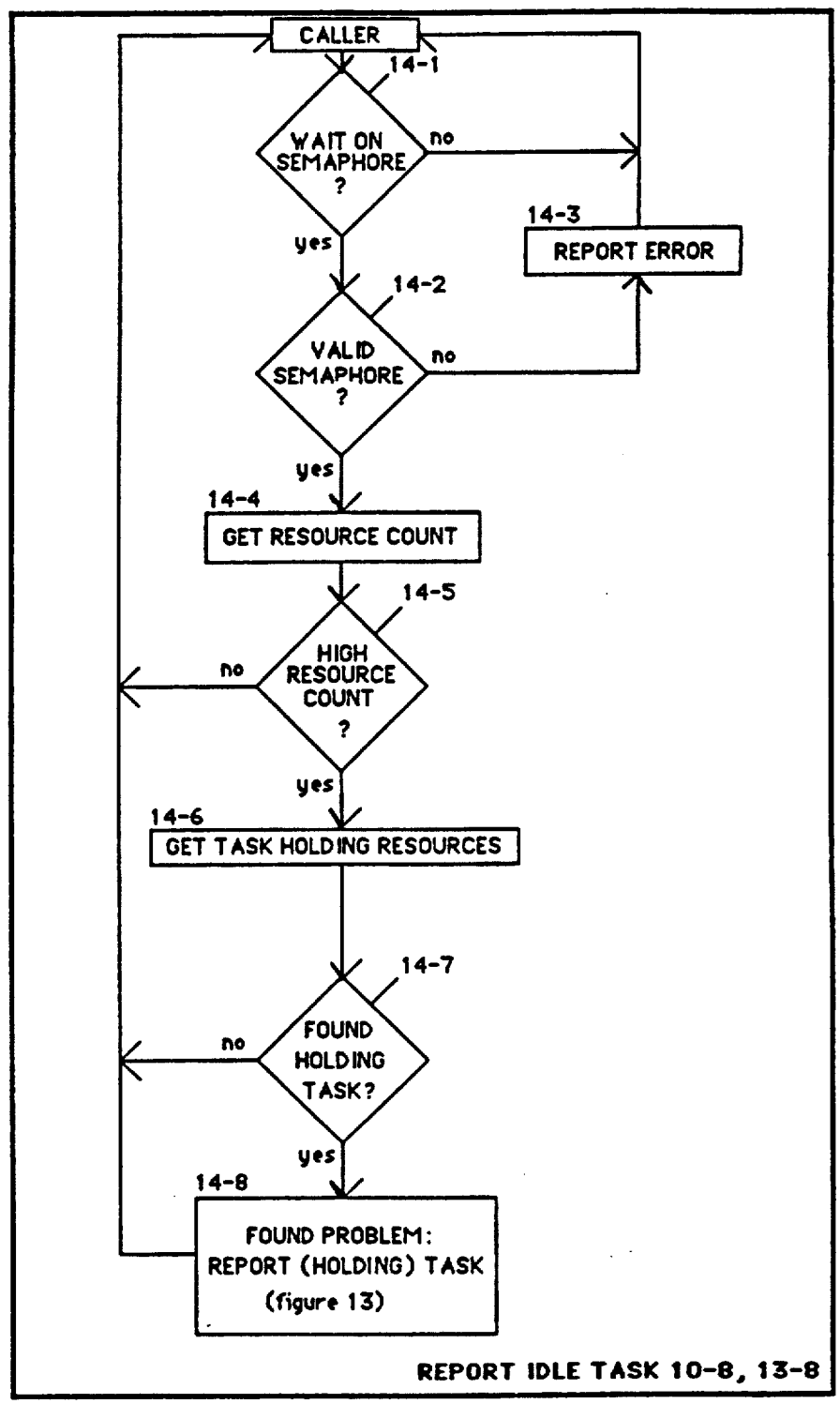

FIGS. 13 and 14 show in greater detail, the organization and operation of reporting tasks and idle task respectively. These two task reporting modules are utility modules which are called in many places within the other modules of FIG. 7. As shown in FIG. 13, module 13-1 starts by checking if the task to report is really a task. If not, module 13-2 reports an error and control is returned to the caller. Otherwise, a second check is performed by module 13-3 to see if the task has already been reported during a previous call of this module from another module of FIG. 7. If so, control is returned to the caller. Otherwise, a third check for validity is performed by module 13-4 and an error is reported by module 13-2 before returning control to the caller if the task is invalid. However, if the task is valid, module 13-5 displays various task information and initiates TSA processing via module 13-6.

TSA processing consists of a loop over all the TSAs used by the task, retrieving relevant information and looking for a problem. Modules 13-61, 13-66 and 13-65 perform the initialization, iteration, and termination condition operations of the loop, respectively. Module 13-62 is in charge of reporting TSA information. Modules 13-63 and 13-64 test for and report the presence of an error. When all the TSAs of the task have been processed in this way, control leaves module 13-6 and is transferred to module 13-7 which checks if the task is an idle task as detected by module 13-6. If it is, module 13-8 reports the idle task before returning to the caller. Otherwise, no problem is apparent and control returns to the caller. The organization and operation of module 13-8 is shown in greater detail in FIG. 14.

FIG. 14 is a special case of FIG. 13. FIG. 13 illustrates task reporting, while FIG. 14 illustrates the reporting of a particular type of task (i.e. an idle task). Idle task reporting begins with module 14-1 which checks for the reason why a task is idle. A task is idle when it is waiting for a system resource to be freed up for use. Resource usage is controlled by semaphores which insure that only one task can access a resource at a given time. If the task tested by module 14-1 is not waiting for a semaphore, it is deemed not idle and control is returned to the caller. Otherwise, control is passed onto module 14-2 which checks if the semaphore is a valid one. If it is not, module 14-3 reports an error before returning control to the caller. However, if the semaphore is valid, module 14-4 retrieves the resources count for this semaphore. This count reflects the number of tasks that are waiting for the semaphore. Module 14-5 then tests to see if the number of tasks waiting for the semaphore is reasonable. If it is, all is deemed normal with the task and control is returned to the caller. If the number is not reasonable, this is identified as a problem and module 14-6 looks for the task that is holding the resource managed by the semaphore on which tasks including the one under scrutiny are waiting. If the holding task if found, as tested by module 14-7, control is passed to module 14-8 to report the identity of the holding task before returning to the caller. If the holding task is not identified, control is returned to the caller directly. It will be noted that module 14-8 performs normal task reporting as described by FIG. 13. Thus, since the caller for idle task reporting can be the task reporting module, the task and idle task reporting modules can call each other recursively and thus enter a double recursion.

Thus, the modules of FIG. 7 which correspond to rulesets are triggered in a deterministic fashion as described above. However, the specific rules within each ruleset or block may be triggered in a different order depending on the values contained in the specific memory dump under analysis. For instance, the validity checks performed by module 107-1 may be performed in a different order for different memory dumps, depending on the particular values contained in the HDM fields for each memory dump.

DETAILED DESCRIPTION OF OPERATION

The operation of the system of FIG. 1 will now be described in detail with respect to analyzing a sample memory dump which produces the results shown in FIG. 8 based upon examining the operating system control structures contained in the memory dump of FIG. 4 which are represented in more human readable form in FIG. 5.

The output 8-1 of FIG. 8 corresponds to the results obtained by validity module 107-1 of FIG. 7. Outputs 8-2 through 8-10 correspond to the results obtained by information module 107-2. The outputs 8-11 through 8-16 correspond to the results obtained by diagnosis module 107-3. The outputs 8-17 through 8-18 correspond to the results obtained by known problem file module 107-5.

As can be seen from output 8-11, the problem in this case is diagnosed as an L2H condition. This module 107-31 is the only block that gets executed inside of module 107-3. Furthermore, since the problem was located in this example, search module 107-4 is bypassed, and the known problem file module 107-5 is called directly by module 107-3, completing the diagnosis process with a success report being generated by module 107-6 as shown by output 8-19.

During operation, control module 10-202 first calls on validity module 107-1 to perform some validity checks. This is done by the expert system accessing the corresponding ruleset object 304-4 through the ruleset control object 302-4 within the knowledge base 10-206 of FIG. 3. As mentioned, each system model can have from 1 to 4 CPUs, labelled CPU 0 through CPU 3 for which there can be an HDM control structure or object corresponding to every CPU in the system contained in knowledge base 10-206. The HDMs which correspond to CPU 0, 1, 2, and 3 must start at hexadecimal addresses 0, 100, 200, and 300, respectively.

Figure 15:
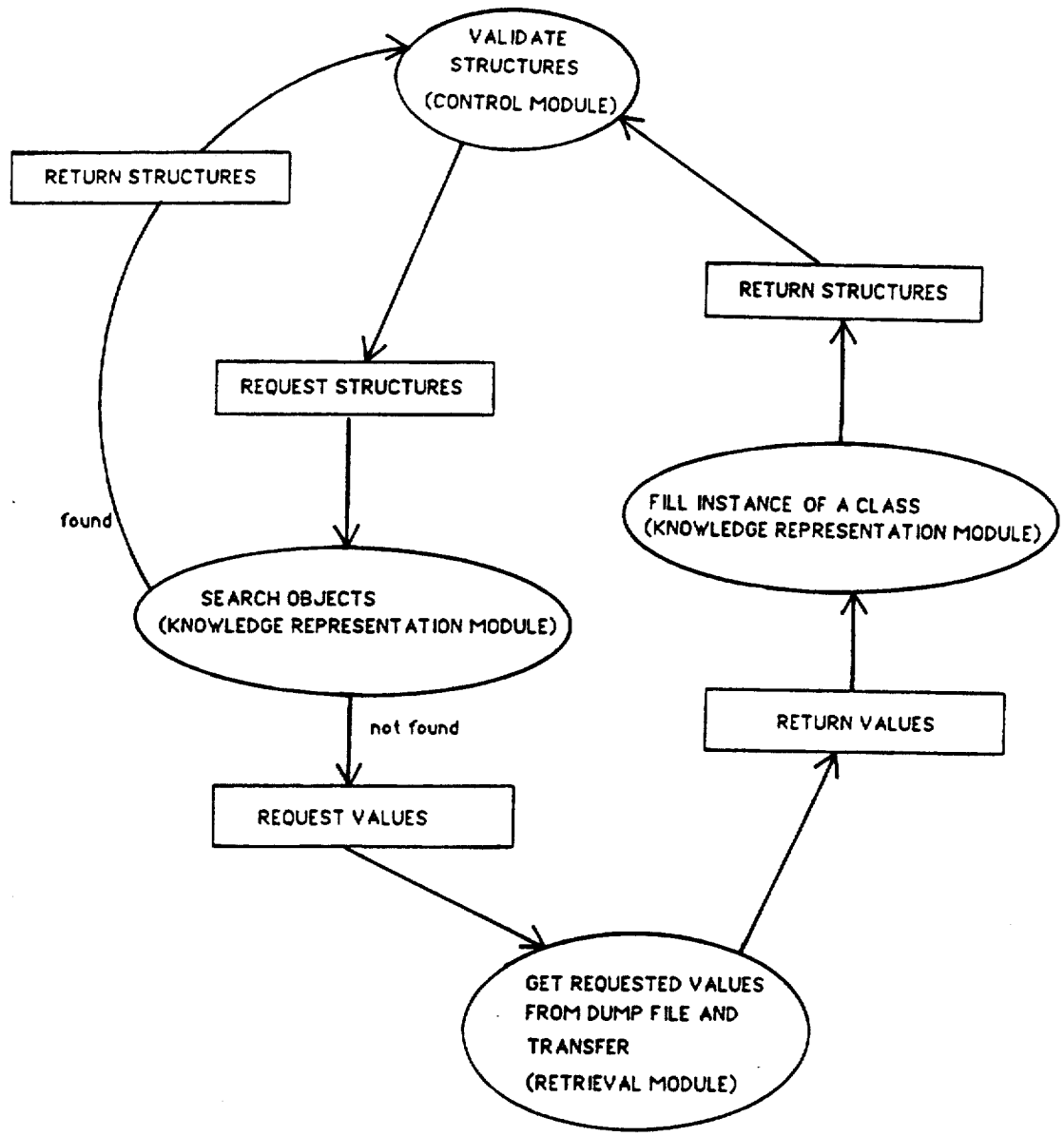
FIGS. 15 through 17e are used to explain the operation of the system of FIG. 1.

In the manner previously described, the control object 301 calls object control 302-3 requesting the first HDM control structure filled with the corresponding memory dump values corresponding to CPU0 (i.e., instance HDM0). This specific instance HDM0 is shown in FIG. 6. If object control 302-3 detects that this instance is not present in knowledge base 10-206, it sends a request to the knowledge representation module 10-222 of FIG. 2. The system performs the sequence of operations shown in FIG. 15 which results in the HDM0 control structure being stored in knowledge base 10-206 which is indicated by the shaded area representation of object 306-4 in FIG. 3.

Control is returned to validity module 107-11. With reference to FIG. 5, module 107-11 then fetches the HDM's first word at hexadecimal offset 0 and checks its validity by verifying that the value it contains is the hexadecimal number 83C0. Module 107-11 also verifies that the starting address of an HDM is a multiple of hexadecimal 100, does not exceed an address value of hexadecimal 300, in addition to matching the number of CPUs. This is done by comparing the starting address of the HDM and the CPU number. The number of CPUs present in the system is determined by retrieving the SCB control structure from the dump and examining the value at location hexadecimal offset 7D. As seen from FIG. 5, the SCB control structure is located by a pointer located at address hexadecimal offset 18 of the HDM as shown in FIG. 5. Module 107-11 first checks the validity of this pointer before retrieving the SCB control structure from the dump. The SCB pointer is valid only if its value is one of the following hexadecimal numbers: 12E2, 1494, 4E8, 4F0, and 12A2 for different releases and updates of the operating system. At this point, the control module generates message 8-1 of FIG. 8 as the first result of the diagnosis.

Once the validity of the HDM for CPU 0 has been established, module 107-12 performs a similar operation on the SCB control structure. This involves verifying that the SCB starting address is equal to its true address found at hexadecimal offset 18 of the HDM of FIG. 5. It also involves checking that the initial and current times are not ZERO. These two times are obtained from the locations of the SCB structure designated by hexadecimal offsets 48 and 4B. Module 107-12 also verifies that the number of CPUs is not 0 or greater than 4 by testing the contents of the location defined by hexadecimal offset 7D of the SCB. Finally, the module 107-12 performs a check to verify that the Group Control Block (GCB) pointer located at hexadecimal offset 6 of the SCB is not ZERO.

Once the validity of the SCB has been established, control is passed onto module 107-13 which determines the validity of the dump. This operation consists in extracting the high physical memory address at the location of the SCB corresponding to a hexadecimal offset 28 and comparing it to the dump size for equality. If this test is completed successfully, module 107-13 passes control back to module 107-1 which is now completed and redirects control to module 107-2.

Since module 107-1 determined that the main structures of the dump are valid, module 107-2 can now safely gather and display some information about the dump. For this operation, control passes sequentially through modules 107-21 through 107-211. Module 107-21 retrieves the type of system from bits B and C of the CLM front end file index field located at hexadecimal offset 158 of the SCB and generates message 8-2 in FIG. 8. Module 107-22 retrieves information defining the type of memory management unit from bits D and E of the CLM front end file index field and generates message 8-3 in FIG. 8.

Module 107-23 reports the boot and dump times located at hexadecimal offsets 48 and 4B of the SCB and generates message 8-4 in FIG. 8. Module 107-23 also checks that the dump time is greater than the boot time and that the difference between the two times is greater than 5 minutes. If the dump time is smaller than the boot time, the time values can not be relied upon since a dump can not be taken before the machine is booted (turned on or re-initialized), and a message to this effect is generated. However, if the dump time is within 5 minutes of the boot time, the system crashed during booting and initialization and a message is generated stating that the boot procedure should be verified. These messages are shown in FIG. 8 since it is assumed that the dump time is much greater than the boot time in the dump under analysis as indicated in message 8-4.

Module 107-24 retrieves from the dump, the HDMs corresponding to CPUs 1, 2, and 3 as a function of CPU number contents at hexadecimal address 7D. The HDMs are obtained by performing the sequence of operations shown in FIG. 15. Module 107-24 performs the checks of module 107-11 for each additional HDM. At this point, module 107-25 determines the major symptom: Level 2 Halt (L2H), Idle State (IS), or Other (0). This is done by obtaining and examining the interrupt activity flag bits of a table located at hexadecimal offset 20 of the HDM for CPU 0 shown in FIG. 5. This table contains 64-bit positions representative of the activity of lines 0 through 63. When the level 2 bit position is in an active state, the symptom is an L2H condition, and the control module designates an L2H condition as the major symptom. However, if level 63 bit position is in an active state but bit positions 0 and 2 are not, then the symptom is an IS condition and module 107-25 designates the major symptom. Finally, if there is no L2H or IS symptom detected, then module 107-25 designates "0" as the major symptom.

Then, module 107-26 translates the interrupt activity flag table values into a human readable form and generates signals for displaying the active levels of the system at the time of the crash. This corresponds to message 8-5 in FIG. 8. This is performed for each CPU in the system. Since FIG. 8 depicts the diagnosis of a mono-CPU system, this operation is performed only once.

At this point, module 107-27 attempts to retrieve the register values that were saved for each CPU just before the crash in the case of an L2H condition. To do this, module 107-27 examines the contents of the HDM location defined by hexadecimal offset 80 to find the task present in the interrupt vector 0 (IV0) (power failure interrupt which is represented by the task control block in FIG. 5). It then looks at the location corresponding to hexadecimal offset −4 of the TCB to obtain the interprocessor communication mailbox structure (ICM). The contents of the location at hexadecimal offset 31 of the ICM is used to locate the Context Save Area (CSA) that contains the saved register values for an L2H condition. These values are then retrieved and displayed as indicated by message 8-6 in FIG. 8.

Module 107-28 attempts to determine the amount of resources that have been used by the system. This is done by extracting the initial, current, and lowest Trap Save Area (TSA) and Internal Request Block (IRB) numbers from hexadecimal offsets BA through BF of the SCB shown in FIG. 5, and comparing these numbers to determine if the current amount of resources is the also the lowest, and if the lowest amount of resources available to the system was sufficient to continue operations. These numbers are contained in message 8-7 in FIG. 8.

Module 107-29 then determines the meaning of the Restricted Functionality Indicator (RFI) values, contained in the location at hexadecimal offset 159 of the SCB, and generates message 8—8 in FIG. 8. Module 107-210 is then called upon to retrieve the Switch Word for the system group control block (SCB) in FIG. 5 and check if the system is in an xstate. This is done by examining the contents of a location called $S at hexadecimal offset 8 of system GCB. Module 107-210 interprets the values of the Switch Word and if these values correspond to an xstate, the problem is deemed found and it is reported. Otherwise, the meaning of the Switch Word values is reported as in message 8-9 in FIG. 8.

Finally, module 107-211 retrieves the list of all the Loaded Bound Units (LDBUs) in the system at the time of the crash and generates a message 8-10 in FIG. 8 in which each BU is displayed along with its start address in hexadecimal notation, and its Software Technical Identifier (STI) which provides information about the nature, release number, and version number of the BU.

This completes processing by module 107-2 which results in control being passed onto module 107-3. Since the major symptom in the case of the example in FIG. 8 was determined to be an L2H condition, control is passed directly to module 107-31 after generating message 8-11. Module 107-31, which is shown in greater detail in FIG. 9, calls module 9-1 to determine the reboot reason code.

Module 9-1 obtains from the location designated as hexadecimal offset 90 of the SCB to find the reboot reason code. It compares this code to the reboot reason code table corresponding to object 307-7 of the knowledge base 10-206 which lists all the possible code with their associated meanings. In the present example, the reboot reason code has an hexadecimal value of 090C, and the associated meaning is "Reboot reason code is 090C = System Task Trp". This meaning is then displayed as message 8-12 in FIG. 8.

Module 9-2 then compares this reboot reason code with the contents of the location designated as hexadecimal offset 1A of the CSA of FIG. 5. If the two values are equal, the task found in the C0 register specified at hexadecimal offset 5 of the CSA is the task that caused the L2H condition. However, if test 9-3 determines that the C0 register could not be found, module 107-31 operation is stopped and control is passed to module 107-34 of FIG. 7. If test 9-4 determines that the reboot reason code is "0902" or "0912," which is meaningless since it corresponds to a L2H requested by a human, a message to this effect is generated and control also leaves module 107-31 and is passed to module 107-34.

In the present example, since this is not the case, message 8-13 is generated describing the task that caused the L2H condition. Thus, control is passed to module 9-6 to retrieve the TCB corresponding to the task that caused the L2H condition.

Once the TCB is located, control is passed to module 9-7 which is shown in greater detail in FIG. 13. The tests 13-1 through 13-3 determine that the TCB given to them is indeed a TCB control structure, has never been encountered before. Unless an error string is given to module 9-7 by the test 13-1 will receive a real TCB. Test 13-2 looks up a list of all the TCBs that have already been reported to determine if the current one is a new one. A TCB is valid if the location designated as hexadecimal offset 01 contains the hexadecimal value FFFF. In the present example, since no error messages appear, control is passed to module 13-5. This block consults various TCB offsets to find the values which are to be incorporated to the rest of message 8-13 in FIG. 8.

Control then passes to module 13-6 which retrieves information about the TSAs that are used by the task that caused the L2H condition. The TSA information is retrieved in a manner similar to TCB information and is reported in messages 8-14 through 8-16 in FIG. 8. Control then leaves module 13-6, returns to the caller (i.e., module 9-7) and after failing test 13-7, leaves module 9-7 therefore terminating the operation of module 107-31. Since the problem has been found, test 107-34 is successful, and module 107-4 is bypassed to go directly to module 107-5.

Module 107-5 performs a search of the Known Problem File (KPF) containing all the dumps previously diagnosed, for a problem description that matches the one currently under analysis. Problem descriptions are stored in the KPF as a list of symptoms derived from the explanation contained in FIG. 8. For the present dump, the list of symptoms is the following: ((TYPE-OF-SYSTEM DPS6-PLUS) (MEMORY-MANAGEMENT VMMU) (MAJOR-SYMPTOM LEVEL-2-HALT) (REBOOT-REASON-CODE 2316) (TASK-CAUSED-LEVEL-2-HALT-AT-LEVEL 11) (TASK-ADDRESS 242930) (TASK-GROUP "$S") (TASK-PC 22246) (BOUND-UNIT "Z3EXECUTIVEL") (BOUND-UNIT-OFFSET 22246) (TASK-DEVICE 6667) (TSA-ADDRESS 75576) (TSA-TRAP-NUM 34) (TSA-INSTR 40772) (TSA-PC 40772) (BOUND-UNIT "ZQLXPT") (BOUND-UNIT-OFFSET 1896) ), where hexadecimal numbers have been translated into decimal notation.

Each symptom in this list is associated with a weight, and the sum of the weights for each symptom constitutes the total weight of the problem. To perform the match, module 107-5 looks for each of the symptoms in the above list in each of the problem descriptions stored in the KPF and adds the corresponding weight to a counter for that description if the symptom is found in its symptom list. When done with all symptoms for the present problem, module 107-5 looks for all the KPF descriptions that have counters with values within 10% of the total weight for the current problem. All such KPF problems are considered to be matches and are displayed.

Since a match was found by module 107-5, test 107-9 results in the reporting of messages 8-17 and 8-18 by module 107-8 for the present example according to the state of the KPF at the time the sample dump was processed. The test 107-10 passes control to module 107-6 which reports a success and generates message 8-19 in FIG. 8, completing the diagnosis of memory dump of the present example.

From the above, it is seen how the system of the present invention automatically diagnoses problems for a number of memory dumps. The organization of the knowledge base in terms of operating system control structure objects and major symptom and subsymptom rules facilitates expansion. The system organization which provides for the creation of the operating system control structures on a demand basis minimizes the amount of data required to be transferred between the host and expert systems.

The system reduces the amount of knowledge required to perform memory dump analysis when human intervention can not be avoided by including the facility for generating full or summary reports as the result of analyzing a memory dump. The known problem file facility of the system avoids having to solve the same problem twice.

It will be apparent to those skilled in the art that many changes may be made to the preferred embodiment of the present invention. For example, while a single host computer system was shown, the present invention may be used to process requests from any number of host systems. Conversely, while the preferred embodiment of the invention utilizes a remote host containing a retrieval module and a local system containing a control module and a knowledge representation module, these control, knowledge representation, and retrieval modules can be resident on a single computer system. The invention is not limited to particular communications links, protocols, data structure formats, etc.

APPENDIX

The following provides a short representative listing of certain ones of the control module rules and operating system control structures in the LISP programming language and the Goldhill GoldWorks expert system building tool object-oriented language.

```
BATCH CONTROL, CORRESPONDING TO FIGURES 17a THROUGH 17e define-handler (rule-control batch) ()
 (cond ((not (send-msg 'sda-host-control :connected))
        (send-msg 'sda-error-control :signal-error
           "Please connect to a host before loading a dump"))
       ((check-connection))
       (t
        (slot-add-value self 'batch-mode :yes)
        (send-msg self :clear)
        (let ((star-list (batch-get-star-list)) (save 1) (save-index 0))
         (ifn star-list
             (send-msg 'sda-error-control :signal-error
                      "No dumps to run in batch")
           (progn
            (setq save
                  (send-msg 'sda-display-control :open-menu 'batch-save-menu))
            (if (< save 1) (setq save -1))
            (do* ((star (pop star-list) (pop star-list))
                  (file (first star) (first star) )
                  (path (string (second star)) (string (second star)))
                  (result (setfile path (slot-add-value 'sda-host-control
                                          'record-size (file-record-size path) ))
                          (setfile path (slot-add-value 'sda-host-control
                                          'record-size (file-record-size path) )))
                  (continue :yes) (stop :no) )
                 ((or (null star) (equal stop :yes)) )
              (multiple-value-setq (continue stop)
                                   (batch-check-connect-and-load))
              (if (and (equal continue :yes) (equal stop :no))
                  (multiple-value-setq (continue stop)
                                       (batch-load-new-dump result file path)))
              (and (equal continue :yes)
                   (or (stringp (send-msg self :run))
                       (gw-run)
                       (equal (slot-value self 'interrupted) :yes) )
                   (setq stop (send-msg 'sda-display-control :open-menu
                                        'batch-stop-menu)) )
              (when (equal stop :no)
                (send-msg self :clear)
                (setq save-index (1+ save-index))
                (if (and (zerop (mod save-index save)) (not (equal save -1)))
                    (send-msg 'sda-known-problem-control :save-kpf)) )) ; endo.
            (ifn (zerop (mod save-index save))
                 (send-msg 'sda-known-problem-control :save-kpf) )
            (slot-add-value self 'batch-mode :no) )))))))

(defun batch-get-star-list ()
  (do ((file) (path) (more :yes) (star-list ()))
      ((equal more :no) star-list)
    (setq file (send-msg 'sda-display-control :open-menu 'batch-star-menu))
    (setq path (send-msg 'sda-display-control :open-menu 'batch-path-menu))
    (setq more (send-msg 'sda-display-control :open-menu 'batch-iterate-menu))
    (unless (or (null file) (null path))
      (setq star-list (append star-list (list (list file path)))) )))
```

```
(defun batch-check-connect-and-load ()
  (cond ((or (not (send-msg 'sda-host-control :connected)) (check-connection))
         (send-msg 'sda-error-control :signal-error
                   "No connection, exiting batch mode")
         (values :no :yes))
        ((send-msg 'sda-host-control :loaded)
         (send-msg 'sda-rule-control :clear)
         (send-msg 'sda-error-control :signal-error "Dump present, clearing")
         (values
           (send-msg 'sda-display-control :open-menu 'batch-continue-menu) :no))
        (t (values :yes :no)) ))

(defun batch-load-new-dump (result file path)
  (cond
    ((stringp result)
     (send-msg 'sda-error-control :signal-error
               (format nil "Can not load dump ~a because:~%~a" path result) )
     (values :no (send-msg 'sda-display-control :open-menu 'batch-stop-menu)) )
    (t
     (slot-add-value 'sda-known-problem-control 'star-number file)
     (setf result (file-type-size))
     (cond ((string-equal (first result) "F_R")
            (slot-add-value 'sda-host-control 'dump-file path)
            (slot-add-value 'sda-host-control 'file-size (second result))
            (slot-add-value 'sda-host-control 'load-status :loaded)
            (values :yes :no))
           (t
            (send-msg 'sda-error-control :signal-error
                      "Specified file is not a valid dump file (not fixed relative)")
            (values :no
              (send-msg 'sda-display-control :open-menu 'batch-stop-menu)) )))))

RULES FOR THE L2H MODULE 107-31 OF FIGURE 7

(define-rule get-reboot-reason (:sponsor level2 :priority 900)
    (major-symptom level-2-halt)
  then
    (reboot-reason (evaluate
       (first (send-msg 'system-control-block-1 :get-value 'offset #x90))))))

(define-rule get-reboot-reason-meaning (:sponsor level2 :priority 850)
    (reboot-reason ?code)
  then
    (send-msg 'sda-known-problem-control :add
      (list 'reboot-reason-code ?code) 7)
    (reboot-reason-meaning (evaluate
       (let ((meaning (send-msg 'reboot-reason-table :index-table ?code)))
         (if (string-equal "Unknown code" meaning)
            (setq meaning (send-msg 'reboot-reason-table-2 :index-table ?code)))
         (if (string-equal "Unknown code" meaning)
            (setq meaning (send-msg 'reboot-reason-table-3 :index-table ?code)))
         meaning ))))

(define-rule report-reboot-reason (:sponsor level2 :priority 850)
    (reboot-reason-meaning ?value)
    (not-equal ?value "Unknown code")
  then
    (send-msg 'sda-explanation-control :add ?value 'b)
    (send-msg 'sda-explanation-control :skip-line 'b))

(define-rule reboot-reason-unknown (:sponsor level2 :priority 850)
    (reboot-reason-meaning ."Unknown code")
    (reboot-reason ?code)
  then
    (send-msg 'sda-explanation-control :add
      (format nil "Reboot reason code is ~x" ?code) 'b)
    (send-msg 'sda-explanation-control :add
      "The SDA does not recognize this code." 'b)
    (send-msg 'sda-explanation-control :skip-line 'b))

;********************************************************************************
```

```
(define-rule get-register-c0 (:sponsor level2 :priority 800)
   (reboot-reason ?code)
   (context-save-area ?csa)
   (valid ?csa t)
   (equal (first (send-msg ?csa :get-value 'offset #x1A)) ?code)
  then
   (register-c0
     (evaluate
       (split-word (first (send-msg ?csa :get-value 'offset 5)) 6 9))
     (evaluate
       (split-word (first (send-msg ?csa :get-value 'offset 5)) 10 15))))

(define-rule can-not-find-level-2-task (:sponsor level2 :priority 700)
   (true)
   (unknown (register-c0 ?cpu ?level))
  then
   (send-msg 'sda-explanation-control :add
      "Can not find task which caused the level 2 halt" 'b)
   (send-msg 'sda-explanation-control :skip-line 'b)
   (send-msg 'sda-rule-control :enable 'checks))

(define-rule report-reboot-reason-reboot (:sponsor level2 :priority 825)
   (register-c0 ?cpu ?level)
   (reboot-reason #x0902)
  then
   (send-msg 'sda-explanation-control :add
      "Since the system halted due to a reboot command, the task which" 'b)
   (send-msg 'sda-explanation-control :add
      "caused the Level 2 Halt will be a reboot task, and therefore" 'b)
   (send-msg 'sda-explanation-control :add
      "probably not of interest." 'b)
   (send-msg 'sda-explanation-control :skip-line 'b)
   (major-symptom other)
   (avoid-level-2-task
     (evaluate (send-msg 'sda-object-control :get 'task-control-block
                 'level (list ?cpu ?level))))
   (send-msg 'sda-rule-control :enable 'checks))

(define-rule report-reboot-reason-force2 (:sponsor level2 :priority 825)
   (register-c0 ?cpu ?level)
   (reboot-reason #x0912)
  then
   (send-msg 'sda-explanation-control :add
      "Since the system was brought to a level 2 halt by the user, the task" 'b)
   (send-msg 'sda-explanation-control :add
      "which caused the Level 2 Halt will be an operator halt, and" 'b)
   (send-msg 'sda-explanation-control :add
      "therefore probably not of interest." 'b)
   (send-msg 'sda-explanation-control :skip-line 'b)
   (major-symptom other)
   (avoid-level-2-task
     (evaluate (send-msg 'sda-object-control :get 'task-control-block
                 'level (list ?cpu ?level))))
   (send-msg 'sda-rule-control :enable 'checks))

(define-rule get-patho-task (:sponsor level2 :priority 800)
   (register-c0 ?cpu ?level)
  then
   (send-msg 'sda-known-problem-control :add
      (list 'task-caused-level-2-halt-at-level ?level) 3)
   (send-msg 'sda-explanation-control :add
      "----------------------------------------" 'b)
   (send-msg 'sda-explanation-control :add
      (format nil "** Task active at level ~x on CPU ~d caused the Level 2 Halt"
         ?level ?cpu) 'b)
   (task
     (evaluate (send-msg 'sda-object-control :get 'task-control-block
                 'level (list ?cpu ?level)))
       ?cpu ?level))

(define-rule report-patho-task (:sponsor level2 :priority 800)
   (task ?task ?cpu ?level)
   (instance-p ?task)
```

```
then
  (send-msg 'sda-display-control :record-patho-task ?task)
  (problem-found)
  (report-task (evaluate (gw-name ?task)) b)
  (send-msg 'sda-rule-control :enable 'report-task))

(define-rule report-more-info (:sponsor level2 :priority 700)
  (major-symptom level-2-halt)
  then
  (send-msg 'sda-rule-control :enable 'checks))
```

HARDWARE DEDICATED MEMORY OPERATING SYSTEM OBJECT, CORRESPONDING TO
MODULE OF FIGURE 305-3. HDM OBJECT 305-3 DEFINES A CLASS OF OBJECTS THAT
PROVIDES THE STRUCTURE FOR THE HDMO THROUGH 3 TEMPLATES 306-4. THESE
TEMPLATES WILL BE FILLED IN WITH SPECIFIC MEMORY DUMP VALUES TO YIELD THE
INSTANCIATED STRUCTURES 307-4.

```
(MAKE-FRAME 'HARDWARE-DEDICATED-MEMORY
:print-name "HARDWARE DEDICATED MEMORY"
:is 'DATA-STRUCTURE
:slots '(
(CPU)
(ACTIVE-LEVELS)
(SIZE :default-values (#x100))
(STABLE :default-values (*HDM-STABLE*)) ; summary display table.
(TABLE :default-values (*HDM-TABLE*))))

(setf *HDM-STABLE* (list
(ml #x00 2 "" "Entry to Power Failure Restart routine")
(ml #x10 2 "" "NATSAP0 - Pointer to next available TSA"
         'POINTER 'TRAP-SAVE-AREA 't)
(ml #x18 2 "" "Pointer to GCOS6 MOD400 System Control Block"
         'POINTER 'SYSTEM-CONTROL-BLOCK)
(ml #x20 4 "" "Interrupt Activity Flag Table"
         'INDWORD 'INTERRUPT-ACTIVITY-FLAG-TABLE-IND)))

(setf *HDM-TABLE* (list
(ml #x00 2 "" "Entry to Power Failure Restart routine")
(ml #x02 2 "" "Reserved for future use")
(ml #x04 2 "" "Reserved for future use")
(ml #x06 2 "" "Reserved for future use")
(ml #x08 2 "" "Reserved for future use")
(ml #x0A 2 "" "NATSAP3 - Pointer to next available TSA (not used)")
(ml #x0C 2 "" "NATSAP2 - Pointer to next available TSA (not used)")
(ml #x0E 2 "" "NATSAP1 - Pointer to next available TSA (not used)")
(ml #x10 2 "" "NATSAP0 - Pointer to next available TSA"
         'POINTER 'TRAP-SAVE-AREA 't)
(ml #x12 2 "" "Reserved for hardware use")
(ml #x14 1 "" "Left: Stackfault interrupt level")
(ml () () "" "Right: Watchdog timer interrupt level")
(ml #x15 1 "" "Left byte: Time slicer clock interrupt level")
(ml () () "" "Right byte: Real time clock interrupt level")
(ml #x16 1 "" "Page Content Addressable Memory flush indicator")
(ml #x17 1 "" "Segment Content Addressable Memory flush indicator")
(ml #x18 2 "" "Pointer to GCOS6 MOD400 System Control Block"
         'POINTER 'SYSTEM-CONTROL-BLOCK)
(ml #x1A 2 "" "Physical address whose content displayed by SMF" 'RAW)
(ml #x1C 1 "" "Software halt status: Left: Halt level, Right: Halt code")
(ml #x1D 1 "" "Left: Unused, Right: Page fault interrupt level")
(ml #x1E 1 "" "Left: Semaphore instruction interrupt level")
(ml () () "" "Right: SMF interrupt level")
(ml #x1F 1 "" "Number of corrected memory errors (not used on DPS6 PLUS")
(ml #x20 4 "" "Interrupt Activity Flag Table"
         'INDWORD 'INTERRUPT-ACTIVITY-FLAG-TABLE-IND)
(ml #x24 2 "" "Trap Vector 2E: RFU")
(ml #x26 2 "" "Trap Vector 2D: RFU")
(ml #x28 2 "" "Trap Vector 2C: RFU")
(ml #x2A 2 "" "Trap Vector 2B: RFU")
(ml #x2C 2 "" "Trap Vector 2A: RFU")
(ml #x2E 2 "" "Trap Vector 29: Unexpected virtual mem. page fault")
(ml #x30 2 "" "Trap Vector 28: V-OP instruction count < 0")
```

```
(ml #x32 2 "" "Trap Vector 27:  P-OP instruction count < 0")
(ml #x34 2 "" "Trap Vector 26:  IO channel access violation")
(ml #x36 2 "" "Trap Vector 25:  Channel Invalid device desc.")
(ml #x38 2 "" "Trap Vector 24:  Call/Return error")
(ml #x3A 2 "" "Trap Vector 23:  Linkage CKL segment > 3FB")
(ml #x3C 2 "" "Trap Vector 22:  Segment fault")
(ml #x3E 2 "" "Trap Vector 21:  Unused")
(ml #x40 2 "" "Trap Vector 20:  Unused")
(ml #x42 2 "" "Trap Vector 1F:  Ring alarm, illegal ring crossing attempt")
(ml #x44 2 "" "Trap Vector 1E:  Trace trap for Call/MCL and Return/RTT")
(ml #x46 2 "" "Trap Vector 1D:  Commercial overflow")
(ml #x48 2 "" "Trap Vector 1C:  Commercial truncation error")
(ml #x4A 2 "" "Trap Vector 1B:  Commercial illegal character")
(ml #x4C 2 "" "Trap Vector 1A:  Commercial illegal specification")
(ml #x4E 2 "" "Trap Vector 19:  Commercial divide by zero")
(ml #x50 2 "" "Trap Vector 18:  Unused")
(ml #x52 2 "" "Trap Vector 17:  Unused")
(ml #x54 2 "" "Trap Vector 16:  Scientific precision error")
(ml #x56 2 "" "Trap Vector 15:  Scientific significance error")
(ml #x58 2 "" "Trap Vector 14:  Scientific program error")
(ml #x5A 2 "" "Trap Vector 13:  Scientific underflow")
(ml #x5C 2 "" "Trap Vector 12:  RFU")
(ml #x5E 2 "" "Trap Vector 11:  Megabus or memory error")
(ml #x60 2 "" "Trap Vector 10:  Program logic error")
(ml #x62 2 "" "Trap Vector 0F:  Reference to unavailable resource")
(ml #x64 2 "" "Trap Vector 0E:  Memory access violation")
(ml #x66 2 "" "Trap Vector 0D:  Privileged instruction trap")
(ml #x68 2 "" "Trap Vector 0C:  Recursive Remote Descriptor Usage")
(ml #x6A 2 "" "Trap Vector 0B:  Megabus operation timeout")
(ml #x6C 2 "" "Trap Vector 0A:  Stack overflow (current function)")
(ml #x6E 2 "" "Trap Vector 09:  Stack underflow (current function)")
(ml #x70 2 "" "Trap Vector 08:  Scientific exponential overflow")
(ml #x72 2 "" "Trap Vector 07:  Scientific divide by zero")
(ml #x74 2 "" "Trap Vector 06:  Arithmetic overflow if M1 bit is set")
(ml #x76 2 "" "Trap Vector 05:  Undefined instruction generating a")
(ml () ()  "" "                 memory reference or scientific branch")
(ml #x78 2 "" "Trap Vector 04:  Reserved for System Use")
(ml #x7A 2 "" "Trap Vector 03:  Reserved for System Use")
(ml #x7C 2 "" "Trap Vector 02:  Trace/Breakpoint trap")
(ml #x7E 2 "" "Trap Vector 01:  Monitor call (MCL)")
(ml #x80 2 "" "IV#0  Powerfailure Interrupt" 'POINTER 'TASK-CONTROL-BLOCK-0)
(ml #x82 2 "" "IV#1" 'POINTER 'TASK-CONTROL-BLOCK)
(ml #x84 2 "" "IV#2  TSA exhaustion" 'POINTER 'TASK-CONTROL-BLOCK)
(ml #x86 2 "" "IV#3  Inhibit interrupts" 'POINTER 'TASK-CONTROL-BLOCK)
(ml #x88 2 "" "IV#4" 'POINTER 'TASK-CONTROL-BLOCK)
(ml #x8A 2 "" "IV#5" 'POINTER 'TASK-CONTROL-BLOCK)
(ml #x8C 2 "" "IV#6" 'POINTER 'TASK-CONTROL-BLOCK)
(ml #x8E 2 "" "IV#7" 'POINTER 'TASK-CONTROL-BLOCK)
(ml #x90 2 "" "IV#8" 'POINTER 'TASK-CONTROL-BLOCK)
(ml #x92 2 "" "IV#9" 'POINTER 'TASK-CONTROL-BLOCK)
(ml #x94 2 "" "IV#A" 'POINTER 'TASK-CONTROL-BLOCK)
(ml #x96 2 "" "IV#B" 'POINTER 'TASK-CONTROL-BLOCK)
(ml #x98 2 "" "IV#C" 'POINTER 'TASK-CONTROL-BLOCK)
(ml #x9A 2 "" "IV#D" 'POINTER 'TASK-CONTROL-BLOCK)
(ml #x9C 2 "" "IV#E" 'POINTER 'TASK-CONTROL-BLOCK)
(ml #x9E 2 "" "IV#F" 'POINTER 'TASK-CONTROL-BLOCK)
(ml #xA0 2 "" "IV#10" 'POINTER 'TASK-CONTROL-BLOCK)
(ml #xA2 2 "" "IV#11" 'POINTER 'TASK-CONTROL-BLOCK)
(ml #xA4 2 "" "IV#12" 'POINTER 'TASK-CONTROL-BLOCK)
(ml #xA6 2 "" "IV#13" 'POINTER 'TASK-CONTROL-BLOCK)
(ml #xA8 2 "" "IV#14" 'POINTER 'TASK-CONTROL-BLOCK)
(ml #xAA 2 "" "IV#15" 'POINTER 'TASK-CONTROL-BLOCK)
(ml #xAC 2 "" "IV#16" 'POINTER 'TASK-CONTROL-BLOCK)
(ml #xAE 2 "" "IV#17" 'POINTER 'TASK-CONTROL-BLOCK)
(ml #xB0 2 "" "IV#18" 'POINTER 'TASK-CONTROL-BLOCK)
(ml #xB2 2 "" "IV#19" 'POINTER 'TASK-CONTROL-BLOCK)
(ml #xB4 2 "" "IV#1A" 'POINTER 'TASK-CONTROL-BLOCK)
(ml #xB6 2 "" "IV#1B" 'POINTER 'TASK-CONTROL-BLOCK)
(ml #xB8 2 "" "IV#1C" 'POINTER 'TASK-CONTROL-BLOCK)
(ml #xBA 2 "" "IV#1D" 'POINTER 'TASK-CONTROL-BLOCK)
(ml #xBC 2 "" "IV#1E" 'POINTER 'TASK-CONTROL-BLOCK)
(ml #xBE 2 "" "IV#1F" 'POINTER 'TASK-CONTROL-BLOCK)
(ml #xC0 2 "" "IV#20" 'POINTER 'TASK-CONTROL-BLOCK)
```

```
(ml #xC2 2 "" "IV#21" 'POINTER 'TASK-CONTROL-BLOCK)
(ml #xC4 2 "" "IV#22" 'POINTER 'TASK-CONTROL-BLOCK)
(ml #xC6 2 "" "IV#23" 'POINTER 'TASK-CONTROL-BLOCK)
(ml #xC8 2 "" "IV#24" 'POINTER 'TASK-CONTROL-BLOCK)
(ml #xCA 2 "" "IV#25" 'POINTER 'TASK-CONTROL-BLOCK)
(ml #xCC 2 "" "IV#26" 'POINTER 'TASK-CONTROL-BLOCK)
(ml #xCE 2 "" "IV#27" 'POINTER 'TASK-CONTROL-BLOCK)
(ml #xD0 2 "" "IV#28" 'POINTER 'TASK-CONTROL-BLOCK)
(ml #xD2 2 "" "IV#29" 'POINTER 'TASK-CONTROL-BLOCK)
(ml #xD4 2 "" "IV#2A" 'POINTER 'TASK-CONTROL-BLOCK)
(ml #xD6 2 "" "IV#2B" 'POINTER 'TASK-CONTROL-BLOCK)
(ml #xD8 2 "" "IV#2C" 'POINTER 'TASK-CONTROL-BLOCK)
(ml #xDA 2 "" "IV#2D" 'POINTER 'TASK-CONTROL-BLOCK)
(ml #xDC 2 "" "IV#2E" 'POINTER 'TASK-CONTROL-BLOCK)
(ml #xDE 2 "" "IV#2F" 'POINTER 'TASK-CONTROL-BLOCK)
(ml #xE0 2 "" "IV#30" 'POINTER 'TASK-CONTROL-BLOCK)
(ml #xE2 2 "" "IV#31" 'POINTER 'TASK-CONTROL-BLOCK)
(ml #xE4 2 "" "IV#32" 'POINTER 'TASK-CONTROL-BLOCK)
(ml #xE6 2 "" "IV#33" 'POINTER 'TASK-CONTROL-BLOCK)
(ml #xE8 2 "" "IV#34" 'POINTER 'TASK-CONTROL-BLOCK)
(ml #xEA 2 "" "IV#35" 'POINTER 'TASK-CONTROL-BLOCK)
(ml #xEC 2 "" "IV#36" 'POINTER 'TASK-CONTROL-BLOCK)
(ml #xEE 2 "" "IV#37" 'POINTER 'TASK-CONTROL-BLOCK)
(ml #xF0 2 "" "IV#38" 'POINTER 'TASK-CONTROL-BLOCK)
(ml #xF2 2 "" "IV#39" 'POINTER 'TASK-CONTROL-BLOCK)
(ml #xF4 2    "IV#3A" 'POINTER 'TASK-CONTROL-BLOCK)
(ml #xF6 2 "" "IV#3B" 'POINTER 'TASK-CONTROL-BLOCK)
(ml #xF8 2 "" "IV#3C" 'POINTER 'TASK-CONTROL-BLOCK)
(ml #xFA 2 "" "IV#3D" 'POINTER 'TASK-CONTROL-BLOCK)
(ml #xFC 2 "" "IV#3E" 'POINTER 'TASK-CONTROL-BLOCK)
(ml #xFE 2 "" "IV#3F" 'POINTER 'TASK-CONTROL-BLOCK)))
```

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A system for automatically analyzing memory dumps, said system comprising:
   retrieval means;
   a number of memory dumps, each memory dump generated as a result of a problem occurring on a given computer system operated- under the control of an operating system, said each dump containing information pertaining to a number of operating system control structures containing information used by the operating system and user programs at the time the dump was generated; and
   an expert system comprising:
      control means including:
         a memory for storing knowledge in the form of objects, said objects including information representative of a plurality of operating system control structures organized into frames and rulesets linked to said frames so as to create decisions using a premise-conclusion if-then form of reasoning; and,
         an inference engine coupled to said memory for interpreting said rulesets using said if-then reasoning; and,
      knowledge representation means coupled to said control means and to said retrieval module, said knowledge representation means for providing dump control structures in response to requests received from said control means, said control means being operative to diagnose said problem causing said memory dump by analyzing the contents of said control structures contained in said memory dump in a predetermined sequence, said knowledge representation means in response to each request causing said retrieval module to transfer only that portion of said memory dump necessary for generating an operating system control structure requested by said control means.

2. The system of claim 1 wherein said control means including validation means, said validation means performing checks on said operating system control structures used by said control means in performing diagnosis.

3. The system of claim 1 wherein said control means include information means, said information means displaying said operating system structure information necessary to explain the analysis being performed by said control means.

4. The system of claim 1 wherein said control means include diagnosis means, said diagnosis means determining the symptom of the problem under consideration and retrieving each specific instance of said operating system structures in which the cause of said problem is apparent.

5. The system of claim 1 wherein said control means include search means, said search means sequencing through all of said operating system control structures contained in said memory dump when said diagnosis means did not generate a conclusion about said problem.

6. The system of claim 1 wherein said control means include known problem file means, said known problem file means storing descriptions of problems previously diagnosed, identified, and resolved, said known problem file means further including problem matching means for comparing the problem currently under consideration with the problems stored in said known problem file.

7. The system of claim 1 wherein said knowledge representation means is organized in a hierarchical data structure of objects in which said objects possess a number of related slots which give specific properties to said objects, a number of descriptors which represent specific constraints of said slots that can be used to modify their behavior, and a number of handlers and daemons associated with said objects to enable communications between said objects.

8. The system of claim 1 wherein said control means include batch control means for enabling the analysis of said number of dumps sequentially without interruption according to specific criteria.

9. The system of claim 8 wherein said batch control means include means for indicating how each of said number of dumps are to be loaded, saved and cleared.

10. The system of claim 1 wherein said system includes at least one host system on which said retrieval means and said number of memory dumps are resident and a local computer system on which said expert system is resident, said systems being interconnected together through a communications link, said retrieval means including means for transmitting data strings back and forth over said communications link between said expert computer system and said host system thus enabling said expert system to access information contained in said memory dump.

11. The system of claim 10 wherein said system further includes a plurality of remotely located host systems, each connected to said communications link for transferring requests to said expert system specifying memory dumps for analysis, said batch control means including file means for listing said requests designating a number of dumps to be analyzed according to specific criteria.

12. A system for automatically analyzing dump files, said system comprising at least one host computer system and a local expert computer system interconnected together by a communications link, said host system including:
a memory for storing a retrieval module and external storage containing a number of memory dumps, each memory dump generated as a result of a problem occurring on a given computer system being operated under the control of an operating system, said each dump containing information pertaining to a number of operating system control structures containing information used by the operating system and user programs at the time the dump was generated; and,
said local computer system including an expert system comprising:
a control module including:
a memory for storing knowledge in the form objects, said objects including information representative of a plurality of operating system control structures organized into frames and rulesets linked to said frames so as to create decisions using a premise-conclusion if-the form of reasoning; and,
an inference engine coupled to said memory for interpreting said rulesets using said if-then reasoning; and,
a knowledge representation module coupled to said control module and to said communications link, said knowledge representation module for providing dump control structures in response to requests received from said control module and said control module being operative to diagnose said problem causing said memory dump by analyzing the contents of said control structures contained in said memory dump in a predetermined sequence, said knowledge representation module in response to each request causing said retrieval module to transfer only that portion of said memory dump necessary for generating an operating system control structure requested by said control module thereby conserving time.

13. The system of claim 12 wherein said control module including a validation module, said validation module performing checks on said operating system control structures used by said control modules in performing diagnosis.

14. The system of claim 12 wherein said control module includes an information module, said information module displaying said operating system structure information necessary to explain the analysis being performed by said control module.

15. The system of claim 12 wherein said control module includes a diagnosis module, said diagnosis module determining the symptom of the problem under consideration and retrieving each specific instance of said operating system structures in which the cause of said problem is apparent.

16. The system of claim 12 wherein said control module includes a search module, said search module sequencing through all of said operating system control structures contained in said memory dump when said diagnosis module did not generate a conclusion about said problem.

17. The system of claim 12 wherein said control module includes a known problem file module, said known problem file module storing descriptions of problems previously diagnosed, identified, and resolved, said known problem file module further including a problem matching module for comparing the problem currently under consideration with the problems stored in said known problem file.

18. The system of claim 12 wherein said knowledge representation module is organized in a hierarchical data structure of objects in which said objects possess a number of related slots which give specific properties to said objects, a number of descriptors which represent specific constraints of said slots that can be used to modify their behavior, and a number of handlers and daemons associated with said objects to enable communications between said objects.

19. The system of claim 12 wherein said retrieval module includes a module for transmitting data strings back and forth over said communications link between said expert computer system and said remote host system thus enabling said expert system to access information contained in said memory dump.

20. The system of claim 12 wherein said control module includes a batch control module for enabling the analysis of said number of dumps sequentially without interruption according to specific criteria.

21. The system of claim 20 wherein said batch control module includes a module for indicating how each of said number of dumps are to be loaded, saved and cleared.

22. The system of claim 12 wherein said system further includes a plurality of remotely located host systems, each connected to said communications link for transferring requests to said expert system specifying memory dumps for analysis, said batch control module including a file for listing said requests designating a number of dumps to be analyzed according to specific criteria.

23. A method of organizing a system for automating the analysis of memory dumps generated as a result of a problem occurring on a given computer system being operated under the control of an operating system, each memory dump containing information pertaining to a number of operating system control structures containing information used by said operating system and user programs at the time the memory dump occurred, said method comprising the steps of:

storing the memory dumps to be analyzed in external storage of said system;

storing a retrieval module on said system for receiving requests, each request specifying a transfer of only a small portion of said memory dump at a time;

installing an expert system in another part of said system, said installing step including the steps of:

storing a control module in said expert system, said control module including a knowledge base containing knowledge in the form of objects, said objects including information representative of a plurality of operating system control structures organized into frames and rulesets linked to said frames so as to create decisions using a premise-conclusion if-then form of reasoning and an inference engine for interpreting said rulesets using said if-then reasoning;

storing a knowledge representation module in said expert system and coupling said representation module to said control module for providing dump control structures in response to requests received from said control module; and, connecting said knowledge representation module to communicate with said retrieval module to transfer requests for only specific portions of said memory dump required for creating said operating system control structures requested by said control module.

24. A method of organizing a system for automating the analysis of memory dumps generated as a result of a problem occurring on a given computer system being operated under the control of an operating system, each memory dump containing information pertaining to a number of operating system control structures containing information used by said operating system and user programs at the time the memory dump occurred, said method comprising the steps of:

storing the memory dumps to be analyzed on a remotely located host computer system;

storing a retrieval module on said host computer system for receiving requests, each request specifying a transfer of only a small portion of said memory dump at a time;

interconnecting a local computer system with said host computer system for communicating said requests through a communications link;

installing an expert system in said local computer system, said installing step including the steps of:

storing a control module in said expert system, said control module including a knowledge base containing knowledge in the form of objects, said objects including information representative of a plurality of operating system control structures organized into frames and rulesets linked to said frames so as to create decisions using a premise-conclusion if-then form of reasoning and an inference engine for interpreting said rulesets using said if-then reasoning;

storing a knowledge representation module in said expert system and coupling said representation module to said control module for providing dump control structures in response to requests received from said control module; and, connecting said knowledge representation module to communicate with said retrieval module to transfer requests for only specific portions of said memory dump required for creating said operating system control structures requested by said control module.

* * * * *